US011588215B2

(12) United States Patent
Kambayashi et al.

(10) Patent No.: US 11,588,215 B2
(45) Date of Patent: Feb. 21, 2023

(54) ENERGY STORAGE DEVICE

(71) Applicant: GS Yuasa International Ltd., Kyoto (JP)

(72) Inventors: Hirokazu Kambayashi, Kyoto (JP); Shohei Yamao, Kyoto (JP); Takuya Aoyama, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 149 days.

(21) Appl. No.: 16/964,136

(22) PCT Filed: Jan. 30, 2019

(86) PCT No.: PCT/JP2019/003253
§ 371 (c)(1),
(2) Date: Jul. 22, 2020

(87) PCT Pub. No.: WO2019/151354
PCT Pub. Date: Aug. 8, 2019

(65) Prior Publication Data
US 2021/0036298 A1 Feb. 4, 2021

(30) Foreign Application Priority Data
Jan. 31, 2018 (JP) .............................. JP2018-014777
Jan. 31, 2018 (JP) .............................. JP2018-014778
(Continued)

(51) Int. Cl.
*H01M 50/54* (2021.01)
*H01M 50/40* (2021.01)
*H01M 10/0587* (2010.01)

(52) U.S. Cl.
CPC ....... *H01M 50/54* (2021.01); *H01M 10/0587* (2013.01); *H01M 50/40* (2021.01)

(58) Field of Classification Search
CPC ....... H01M 50/54; H01M 50/50; H01M 50/40
See application file for complete search history.

(56) References Cited

U.S. PATENT DOCUMENTS

2006/0024578 A1    2/2006  Lee
2009/0081537 A1*   3/2009  Kim ...................... H01M 50/20
                                                          429/176
(Continued)

FOREIGN PATENT DOCUMENTS

CN    104810523 A    7/2015
CN    104995766 A    10/2015
(Continued)

OTHER PUBLICATIONS

English Translation of: FR 2109327A, May 26, 1972, Leroy-Somer.*
(Continued)

Primary Examiner — Kenneth J Douyette
(74) Attorney, Agent, or Firm — McGinn I.P. Law Group, PLLC.

(57) ABSTRACT

An energy storage device includes: an electrode assembly; a case that houses the electrode assembly; and a spacer that is a side spacer disposed between the electrode assembly and the case. The spacer has a rear portion disposed to face the electrode-assembly end portion, a side portion extended in a direction along the side surface of the electrode assembly, and a connection that rotatably connects the side portion to the rear portion.

4 Claims, 14 Drawing Sheets

(30) Foreign Application Priority Data

| Jan. 31, 2018 | (JP) | JP2018-014779 |
| Jan. 31, 2018 | (JP) | JP2018-014780 |
| Jan. 31, 2018 | (JP) | JP2018-014781 |
| Jan. 31, 2018 | (JP) | JP2018-014782 |
| Jan. 31, 2018 | (JP) | JP2018-014783 |
| Jan. 31, 2018 | (JP) | JP2018-014932 |
| Jan. 31, 2018 | (JP) | JP2018-014933 |
| Jan. 31, 2018 | (JP) | JP2018-014935 |
| Jan. 31, 2018 | (JP) | JP2018-014936 |
| Jan. 31, 2018 | (JP) | JP2018-014937 |
| Jan. 31, 2018 | (JP) | JP2018-014938 |

(56) References Cited

U.S. PATENT DOCUMENTS

| 2011/0311851 A1 | 12/2011 | Shinoda et al. |
| 2012/0189889 A1 | 7/2012 | Kim |
| 2013/0029188 A1 | 1/2013 | Kim et al. |
| 2013/0084488 A1 | 4/2013 | Waki et al. |
| 2014/0268525 A1* | 9/2014 | Hwang ............ B05D 3/144 361/679.01 |
| 2014/0322578 A1 | 10/2014 | Shinoda et al. |
| 2014/0377607 A1 | 12/2014 | Urano |
| 2015/0207125 A1 | 7/2015 | Kishimoto |
| 2017/0125769 A1 | 5/2017 | Yang et al. |
| 2017/0133718 A1 | 5/2017 | Suzuki |
| 2018/0069226 A1 | 3/2018 | Waki et al. |
| 2018/0130979 A1 | 5/2018 | Shinoda et al. |
| 2020/0044205 A1 | 2/2020 | Shinoda et al. |

FOREIGN PATENT DOCUMENTS

| FR | 2109327 A | * | 5/1972 | ............ B29F 1/00 |
| JP | 2006-040901 A | | 2/2006 | |
| JP | 2008-063752 A | | 3/2008 | |
| JP | 2011-008944 A | | 1/2011 | |
| JP | 2011-108507 A | | 6/2011 | |
| JP | 2012-156134 A | | 8/2012 | |
| JP | 2013-026214 A | | 2/2013 | |
| JP | 2013-089558 A | | 5/2013 | |
| JP | 2013-093314 A | | 5/2013 | |
| JP | 2013-168283 A | | 8/2013 | |
| JP | 2013-219061 A | | 10/2013 | |
| JP | 2014-164805 A | | 9/2014 | |
| JP | 2015-092507 A | | 5/2015 | |
| JP | 2015-156366 A | | 8/2015 | |
| JP | 2015-185470 A | | 10/2015 | |
| JP | 2016-039090 A | | 3/2016 | |
| JP | 2016-085912 A | | 5/2016 | |
| JP | 2016-139491 A | | 8/2016 | |
| JP | 2017-091792 A | | 5/2017 | |
| JP | 2017-157342 A | | 9/2017 | |
| JP | 2017-528870 A | | 9/2017 | |

OTHER PUBLICATIONS

Machine Translation of: JP 2014/164805A, Sep. 8, 2014, Urano.*
International Search Report (ISR) (PCT Form PCT/ISA/210), in PCT/JP2019/003253, dated May 7, 2019.

* cited by examiner

ENERGY STORAGE DEVICE

TECHNICAL FIELD

The present invention relates to an energy storage device including a case that houses an electrode assembly and a side spacer disposed between the electrode assembly and the case.

BACKGROUND ART

Conventionally, there is known an energy storage device including a case that houses an electrode assembly and a side spacer disposed between the electrode assembly and the case. For example, Patent Document 1 discloses a battery provided with; a wound electrode group housed in a metal exterior can; a positive insulating cover fitted to one end portion of the wound electrode group including a positive current collector tab; and a negative insulating cover fitted to the other end portion of the wound electrode group including a negative current collector tab. In this battery, the positive insulating cover includes a U-shaped member having first and second side walls facing each other, a rear member, and a holding portion for holding a positive current collector tab and an extended portion of a positive electrode lead connected to the positive current collector tab. Patent Document 1 describes that the above structure achieves a highly safe battery in which contact among the lead, the electrode group, and the exterior can is prevented.

PRIOR ART DOCUMENT

Patent Document

Patent Document 1: JP-A-2015-92507

SUMMARY OF THE INVENTION

Problems to be Solved by the Invention

In the side spacer described in Patent Document 1, the difficulty in attaching the side spacer to the electrode assembly may increase.

It is an object of the present invention to provide an energy storage device that includes a side spacer disposed between an electrode assembly and the case and can be manufactured efficiently.

Means for Solving the Problems

An energy storage device according to one aspect of the present invention is an energy storage device including: an electrode assembly; a case that houses the electrode assembly; and a side spacer disposed between the electrode assembly and the case. The side spacer includes a rear portion that is disposed to face an end portion of the electrode assembly, a side portion that is extended in a direction along a side surface of the electrode assembly, and a connection that rotatably connects the side portion to the rear portion.

Advantages of the Invention

According to the present invention, it is possible to provide an energy storage device that includes a side spacer disposed between an electrode assembly and a case and can be manufactured efficiently.

MODE FOR CARRYING OUT THE INVENTION

Figure 1:
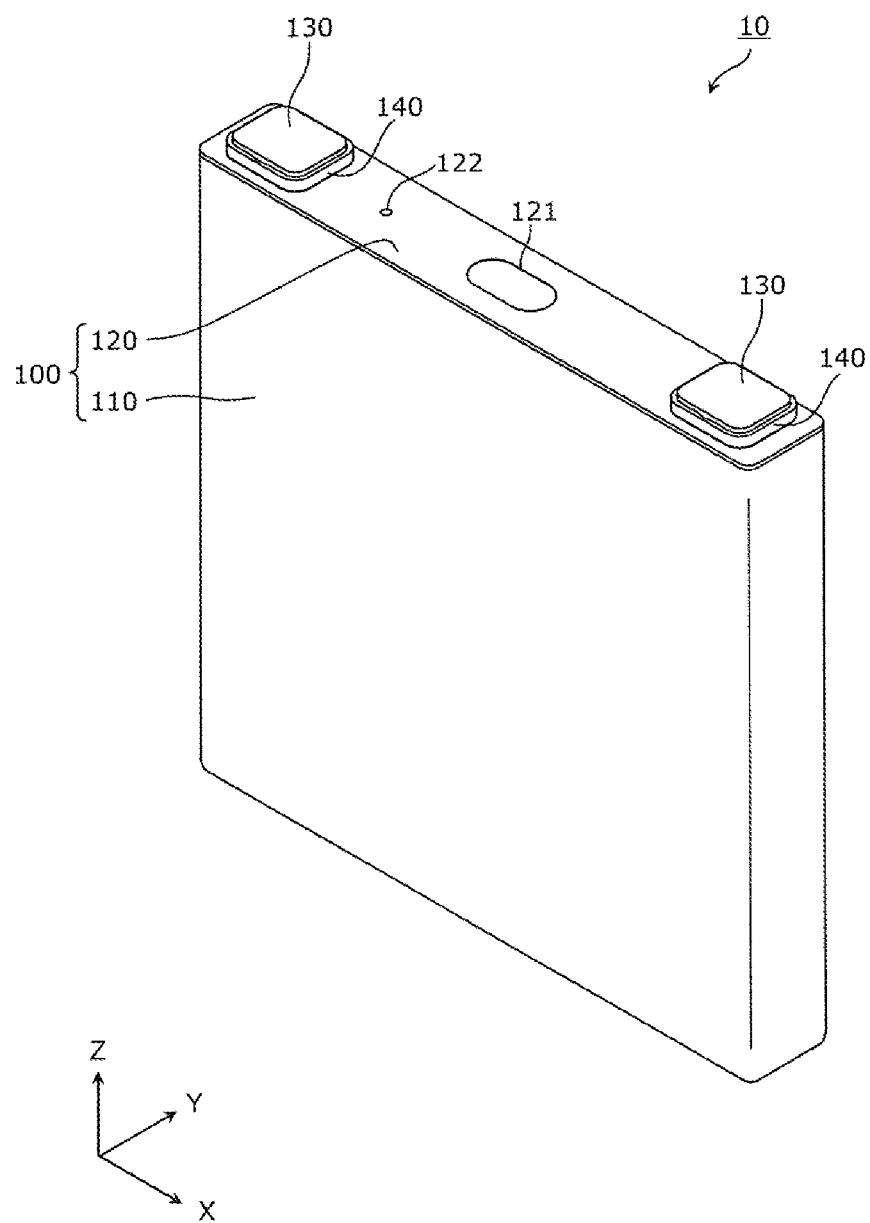
FIG. 1 is a perspective view illustrating an appearance of an energy storage device according to an embodiment.

The present inventors have found that the following problem occurs with respect to the side spacer in Patent Document 1 described above. Each of the positive insulating cover and the negative insulating cover in Patent Document 1 has the rear member and the U-shaped member fixed to the rear member and having first and second side walls. The side spacer having a pair of side portions which sandwich the end portion of the electrode assembly as thus described is attached to the electrode assembly such that the end portion of the electrode assembly is inserted between the pair of side portions. In this instance, the side portion of the side spacer rubs the end portion or the side surface of the electrode assembly, which may cause a problem such as bending or breakage of the electrode plate. Thus, for preventing such a problem from occurring, it is necessary to perform the attachment work carefully while devising the orientation of the side spacer at the time of attaching the side spacer to the electrode assembly. For example, a wound electrode assembly may increase its thickness due to the occurrence of spring back, and in this instance, particularly the difficulty in attaching the side spacer to the electrode assembly increases.

An energy storage device according to one aspect of the present invention is an energy storage device including: an electrode assembly; a case that houses the electrode assembly; and a side spacer disposed between the electrode assembly and the case. The side spacer includes a rear portion that is disposed to face an end portion of the electrode assembly, a side portion that is extended in a direction along a side surface of the electrode assembly, and a connection that rotatably connects the side portion to the rear portion.

With this configuration, in a configuration in which the side spacer has the rear portion and the side portion, the side portion is rotatably connected to the rear portion. Thus, at the time of attaching the side spacer to the electrode assembly, the side portion can be brought into contact with the electrode assembly by rotating the side portion toward the electrode assembly. That is, on at least two surfaces, the work of attaching the side spacer, which can insulate between the electrode assembly and the case and prevent the movement of the electrode assembly, to the end portion of the electrode assembly is facilitated. As described above, the energy storage device according to the present aspect is an energy storage device that includes a side spacer and can be manufactured efficiently.

The case may have a first wall and a second wall adjacent to the first wall, the rear portion may be disposed to face the first wall, the side portion may be disposed to face the second wall, and the connection may be disposed to face an end portion of the first wall or an end portion of the second wall.

With this configuration, for example, the connection is located at a corner part where the rear portion and the side portion abut against each other, and hence the end portion of the electrode assembly is easily covered with the side spacer.

The side spacer may have a convex part projecting toward the electrode assembly.

The side spacer according to the present aspect can be formed with the side portion open with respect to the rear portion, whereby a convex part having a complex shape can be formed. This makes it possible for the side spacer to have a convex part suitable for a predetermined purpose such as stabilization of the position of the side spacer. That is, the side spacer excellent in functions, such as preventing the movement of the electrode assembly, can be manufactured with comparative ease.

The side spacer may be formed using a resin material, and at least one of the rear portion and the side portion may have an inflow mark of the resin material.

With this configuration, at least one of the rear portion and the side portion is formed using a resin material having been flowed into a mold from an inlet (gate) different from the other. Therefore, the movement of the resin material between the space for the rear portion and the space for the side portion in the mold may be unnecessary or small, whereby the space (a gap in the mold) for the connection can be narrowed. Hence the connection for rotatably supporting the rear portion can be easily formed thin. That is, it is possible to produce, with comparative ease, the side spacer that is easily attached to the electrode assembly or is excellent in functions such as preventing the movement of the electrode assembly.

The electrode assembly may be formed by an electrode plate and a separator being wound, and the rear portion is disposed to face an end portion of the electrode assembly in a winding-axis direction.

With this configuration, the end portion of the electrode assembly, which is a part where the edge of the electrode plate and the edge of the separator are stuck and which is a relatively weak portion, can be protected by the side spacer. At the time of attaching the side spacer to the end portion of the electrode assembly, the edge of the separator or the electrode plate can be attached without causing the side portion to be turned up.

The present invention can be realized not only as the energy storage device as thus described but also as the spacer provided in the energy storage device.

Hereinafter, energy storage devices according to an embodiment of the present invention and its modifications will be described with reference to the drawings. Any of the embodiment and its modifications described below illustrates a comprehensive or specific example. Numeral values, shapes, materials, components, placement positions and connection forms of the components, manufacturing steps, a sequence of the manufacturing steps, and the like shown in the following embodiment are only examples and are not intended to limit the present invention. Among the components in the following embodiment, components not described in the independent claim indicating the highest concept will be described as optional components. In each figure, dimensions and the like are not illustrated strictly.

In descriptions and drawings below, the X-axis direction is defined by a juxtaposing direction of a pair of (positive and negative, the same will apply hereinafter) electrode terminals of an energy storage device, a juxtaposing direction of a pair of current collectors, a juxtaposing direction of a pair of upper gaskets, a juxtaposing direction of a pair of lower gaskets, a juxtaposing direction of a pair of spacers, a juxtaposing direction of both end portions (pair of active material layer non-forming portions) of an electrode assembly, a winding-axis direction of the electrode assembly, or a facing direction of the short side surfaces of a case. The Y-axis direction is defined by a facing direction of the long side surfaces of the case, a lateral direction of the short side surface of the case, or a thickness direction of the case. The Z-axis direction is defined by a juxtaposing direction of a case body and a lid of the energy storage device, a longitudinal direction of the short side surface of the case, or an extending direction of legs (electrode assembly connection) of the current collector. The X-axis direction, the Y-axis direction, and the Z-axis direction are mutually intersecting (orthogonal in the present embodiment) directions. In the following description, for example, an X-axis plus direction indicates an arrow direction of the X-axis, and an X-axis minus direction indicates a direction opposite to the X-axis plus direction. The same applies to the Y-axis direction and the Z-axis direction.

(Embodiment)

[1. General Description of Energy Storage Device]

Figure 2:
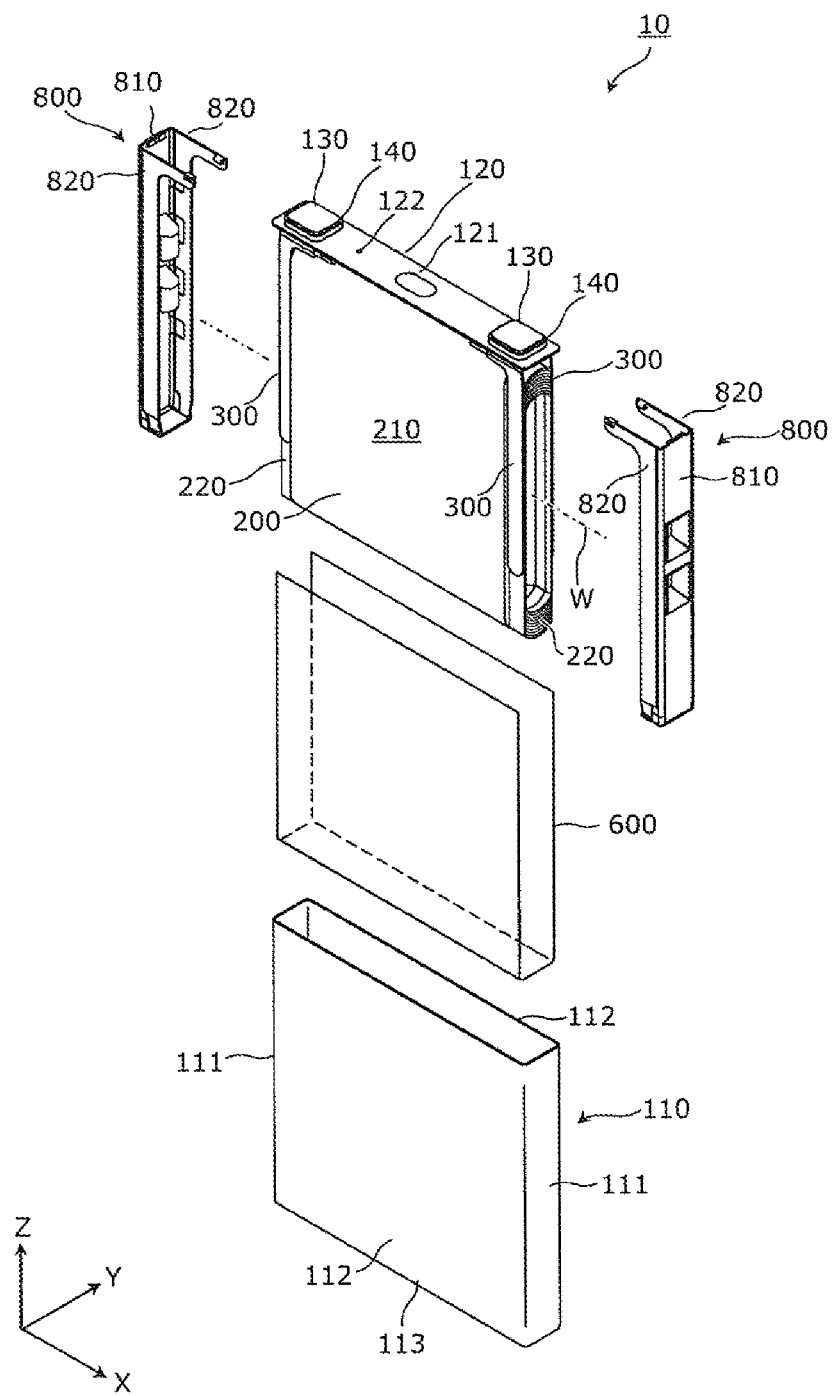
FIG. 2 is a perspective view illustrating components that are disposed in a case of the energy storage device according to the embodiment.
Figure 3:
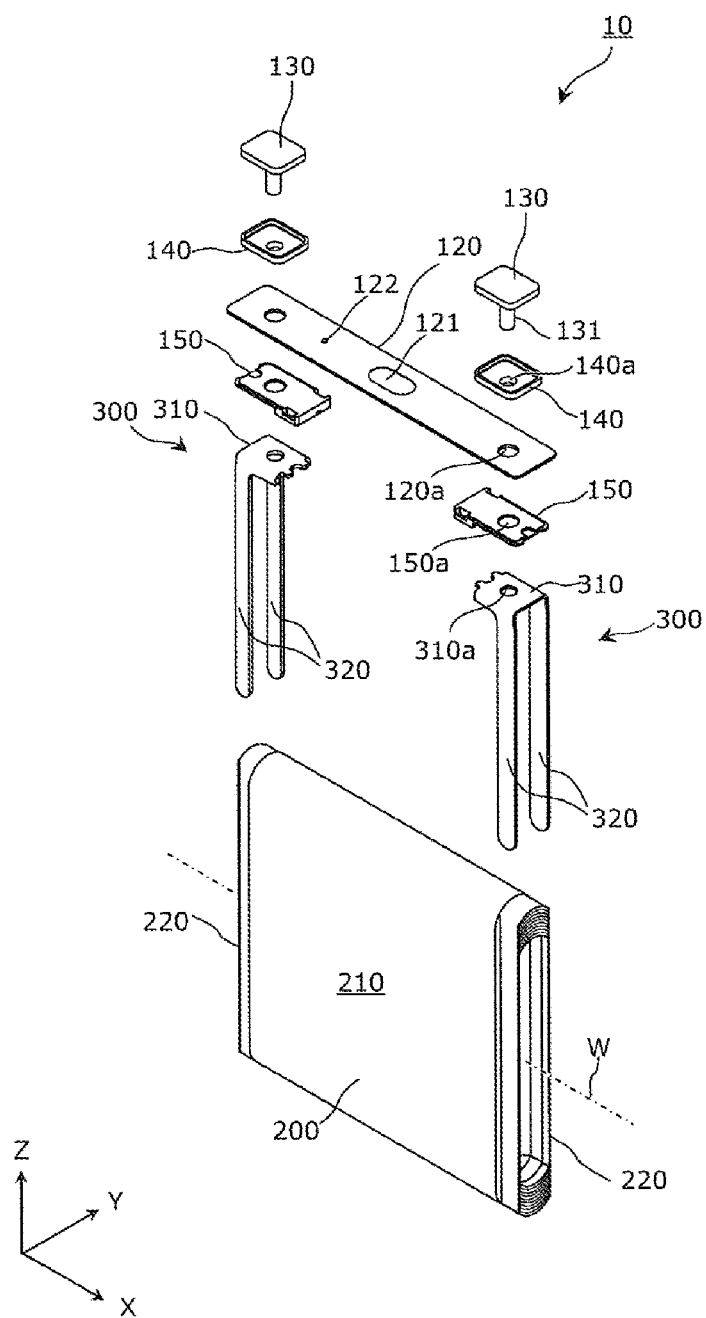
FIG. 3 is an exploded perspective view illustrating each component of the energy storage device according to the embodiment in an exploded state.

First, a general description of an energy storage device 10 in the present embodiment will be given with reference to FIGS. 1 to 3. FIG. 1 is a perspective view illustrating the appearance of the energy storage device 10 according to the embodiment. FIG. 2 is a perspective view that illustrates components disposed in a case 100 of the energy storage device 10 according to the embodiment. Specifically, FIG. 2 is a perspective view illustrating a configuration with a case body 110, a spacer 800, and an insulating sheet 600 separated from the energy storage device 10, and illustrates a state after a current collector 300 has been joined to an electrode assembly 200. FIG. 3 is an exploded perspective view illustrating each component of the energy storage device 10 according to the embodiment in an exploded state. Specifically, FIG. 3 is a perspective that illustrates components except for the case body 110, the spacer 800, and the insulating sheet 600 illustrated in FIG. 2 in an exploded state, and illustrates a state before the current collector 300 is joined to the electrode assembly 200.

The energy storage device 10 is a secondary battery that can be charged with electricity and can discharge electricity, and is specifically a nonaqueous electrolyte secondary battery such as a lithium ion secondary battery. The energy storage device 10 is used as a power source for an automobile such as an electric vehicle (EV), a hybrid electric vehicle (HEV), or a plug-in hybrid electric vehicle (PHEV), a power source for electronic equipment, a power storage power source, or the like. The energy storage device 10 may be mounted on a vehicle such as a gasoline vehicle and a diesel vehicle as a battery for starting an engine. The energy storage device 10 is not limited to a nonaqueous electrolyte secondary battery but may be a secondary battery except for the nonaqueous electrolyte secondary battery, or a capacitor. The energy storage device 10 may not be a secondary battery but may be a primary battery that can use stored electricity without being charged with electricity by a user. The energy storage device 10 may be a battery using a solid electrolyte. Although the energy storage device 10 having a rectangular parallelepiped shape (prismatic shape) is illustrated in the present embodiment, the shape of the energy storage device 10 is not limited to the rectangular parallelepiped shape but may be a columnar shape, an oblong columnar shape, or a polygonal columnar shape except for the rectangular parallelepiped shape. The energy storage device 10 may be a laminate type energy storage device.

As illustrated in FIG. 1, the energy storage device 10 includes the case 100, positive and negative electrode terminals 130, and positive and negative upper gaskets 140. As illustrated in FIGS. 2 and 3, positive and negative lower gaskets, the electrode assembly 200, the positive and negative current collectors 300, the positive and negative spacers 800, and the insulating sheet 600 are housed inside the case 100. The case 100 is filled with an electrolyte solution (nonaqueous electrolyte), which is not illustrated. The type of the electrolyte solution is not particularly limited unless impairing the performance of the energy storage device 10, and various electrolyte solutions can be selected.

The case 100 is a rectangular parallelepiped (prismatic) case having the case body 110 with an opening formed therein and a lid 120 for closing the opening of the case body 110. The case body 110 is a rectangular cylindrical member having a bottom, constituting a body portion of the case 100. The case body 110 has two first walls 111 on both side surfaces in the X-axis direction, two second walls 112 on both side surfaces in the Y-axis direction, and a third wall 113 on the Z-axis minus side. Specifically, the first wall 111 is a rectangular plate-shaped short side portion forming the short side surface of the case 100. In other words, the first wall 111 is a wall adjacent to the second wall 112 and the third wall 113 and having a smaller surface area (area of the outer surface) than that of the second wall 112. The second wall 112 is a rectangular plate-like long side portion forming the long side surface of the case 100. In other words, the second wall 112 is a wall adjacent to the first wall 111 and the third wall 113 and having a larger surface area (area of the outer surface) than that of the first wall 111. The third wall 113 is a rectangular plate-shaped bottom wall which forms the bottom surface of the case 100.

The lid 120 is a rectangular plate-like member constituting a lid portion of the case 100 and is disposed on the Z-axis plus side of the case body 110. That is, the lid 120 is a wall facing the third wall 113 and adjacent to the first wall 111 and the second wall 112. In the present embodiment, the lid 120 is provided with the electrode terminals 130 on the positive electrode side and the negative electrode side, and is further provided with a gas release valve 121 for releasing pressure inside the case 100 when the pressure increases, an electrolyte solution filling portion 122 for injecting an electrolyte solution into the case 100, and the like.

With such a configuration, the case 100 has a structure in which, after housing of the electrode assembly 200 with the spacer 800 attached thereto into the case body 110, the case body 110 and the lid 120 are joined by welding or the like to seal the inside. The material of each of the case body 110 and the lid 120 is not particularly limited but can be a weldable metal such as stainless steel, aluminum, or aluminum alloy. A resin can also be used as the material of each of the case body 110 and the lid 120, The electrode assembly 200 is an energy storage element (power generating element) provided with a positive electrode plate, a negative electrode plate, and a separator, and capable of storing electricity. The positive electrode plate is an electrode plate in which a positive active material layer is formed on a positive substrate layer that is a long strip-shaped current collector foil made of aluminum or an aluminum alloy. The negative electrode plate is an electrode plate in which a negative active material layer is formed on a negative substrate layer that is a long strip-shaped current collector foil made of copper or a copper alloy. As the current collecting foil, a known material, such as nickel, iron, stainless steel, titanium, fired carbon, conductive polymer, conductive glass, or Al—Cd alloy, can be used as appropriate. As the positive active material and the negative active material used for the positive active material layer and the negative active material layer, a known material can be used as appropriate so long as being an active material capable of occluding and releasing lithium ions. As the separator, a microporous sheet made of a resin or a nonwoven fabric can be used.

The electrode assembly 200 is formed by disposing and winding a separator between the positive electrode plate and the negative electrode plate. Specifically, in the electrode assembly 200, the positive electrode plate and the negative electrode plate are wound around each other while shifted from each other in a direction of a winding axis W (a virtual axis parallel to the X-axis direction in the present embodiment) via the separator. The positive electrode plate and the negative electrode plate have parts (active material layer non-forming portion) where the substrate layer is exposed without being coated with the active material (without forming the active material layer) at the end portions in the respective shifted directions.

That is, the electrode assembly 200 has an electrode assembly body portion 210 which is a body portion having an active material layer formed thereon, and an electrode-assembly end portion 220 projecting from the electrode assembly body portion 210 in the X-axis plus direction or the X-axis minus direction. A positive bundling portion in which the active material layer non-forming portions of the positive electrode plate are stuck and bundled is provided at one electrode-assembly end portion 220 of the two electrode-assembly end portions 220. A negative bundling portion in which the active material layer non-forming portions of the negative electrode plate are stuck and bundled is provided at the other electrode-assembly end portion 220. In the present embodiment, an oblong shape is illustrated as a cross-sectional shape of the electrode assembly 200, but the cross-sectional shape may be a circular shape, an elliptic shape, or the like.

As illustrated in FIG. 3, the electrode assembly 200 is formed in a flat shape having a narrow width in the Y-axis direction, and a main stacking direction of the electrode plates (positive and negative electrode plates) is the Y-axis direction. Therefore, in the present embodiment, the electrode plate stacking direction in the electrode assembly 200 means the Y-axis direction.

The electrode terminals 130 are terminals (positive electrode terminal and negative electrode terminal) electrically connected to the positive electrode plate and the negative electrode plate of the electrode assembly 200 via the current collectors 300. That is, the electrode terminal 130 is a metal member for introducing the electricity stored in the electrode assembly 200 to the external space of the energy storage device 10 and introducing the electricity into the internal space of the energy storage device 10 in order to store the electricity in the electrode assembly 200. The electrode terminal 130 is attached to the lid 120 disposed above the electrode assembly 200. Specifically, as illustrated in FIG. 3, a shaft 131 is inserted into a through hole 140a of the upper gasket 140, a through hole 120a of the lid 120, a through hole 150a of a lower gasket 150, and the through hole 310a of the current collector 300, and is caulked, whereby the electrode terminal 130 is fixed to the lid 120 together with the current collector 300. The positive electrode terminal 130 is made of aluminum or an aluminum alloy, and the negative electrode terminal 130 is made of copper or a copper alloy.

The current collectors 300 are members (positive electrode current collector and negative electrode current collector) disposed on both sides in the X-axis direction of the electrode assembly 200 and connected to the electrode-assembly end portions 220. Specifically, the current collector 300 has a fixed end portion 310 which is an end portion fixed to the case 100 together with the lower gasket 150 being an example of an insulating member, and a pair of legs 320 extended from the fixed end portion 310. The pair of legs 320 of the current collector 300 on the positive electrode side are joined to the electrode-assembly end portion 220 on the positive electrode side, and the pair of legs 320 of the current collector 300 on the negative electrode side are joined to the electrode-assembly end portion 220 on the negative electrode side. As a method for the joining, ultrasonic welding or calking joining is adopted. With this configuration, the electrode assembly 200 is held (supported) in the state of being suspended from the lid 120 by the two current collectors 300, and shaking due to vibration, impact, or the like is prevented. The material of the current collector 300 is not limited. For example, similarly to the positive substrate layer of the electrode assembly 200, the current collector 300 on the positive electrode side is made of a metal member such as aluminum or an aluminum alloy. Similarly to the negative substrate layer of the electrode assembly 200, the current collector 300 on the negative electrode side is made of a metal member such as copper or a copper alloy The spacer 800 is a spacer disposed between the electrode assembly 200 and the case 100. In the present embodiment, the spacer 800 is a side spacer formed by being disposed lateral to (in the X-axis plus direction or X-axis minus direction) the electrode assembly 200 and the current collector 300 and being extended in the Z-axis direction.

More specifically, the spacer 800 is a spacer having a (viewed from the Z-axis) U-shape in a top view, disposed between the electrode assembly 200/the current collector 300 and the first wall 111/the end portion of the second wall 112 of the case body 110, and disposed so as to extend along the first wall 111 and the end portion of the second wall 112. That is, the spacer 800 is disposed so as to sandwich the electrode-assembly end portion 220 and the current collector 300 from both ends in the Y-axis direction.

Here, the spacer 800 is made of an insulating material such as polypropylene (PP), polyethylene (PE), polyphenylene sulfide resin (PPS), polyethylene terephthalate (PET), polyether ether ketone (PEEK), tetrafluoroethylene perfluoroalkyl vinyl ether (PFA), polytetrafluoroethylene (PTFE), polybutylene terephthalate (PBT), polyether sulfone (PES), ceramic, and composites thereof. That is, the spacer 800 insulates the electrode assembly 200 and the current collector 300 from the case 100. The spacer 800 fills the space between the electrode assembly 200 and the current collector 300 and the case 100 to support the electrode assembly 200 and the current collector 300 so as not to vibrate with respect to the case 100. The configuration of the spacer 800 will be described in detail later.

The upper gaskets 140 are members (positive upper gasket and negative upper gasket) disposed between the lid 120 of the case 100 and the electrode terminals 130, and insulates and seals the lid 120 and the electrode terminals 130. Specifically, the upper gasket 140 has a shape in which the through hole 140a into which the shaft 131 of the electrode terminal 130 is inserted is formed in a central part of a substantially plate-like member having a rectangular shape. The shaft 131 is inserted into the through hole 140a and caulked, whereby the upper gasket 140 is fixed to the lid 120. The upper gasket 140 is formed using a resin such as PP, PE, PPS, PET, PEEK, PFA, PTFE, PBT, or PES.

The lower gasket 150 are members (positive lower gasket and negative lower gasket) disposed between the lid 120 of the case 100 and the current collectors 300, and insulating the lid 120 from the current collectors 300. Specifically, the lower gasket 150 has a shape in which the through hole 150a into which the shaft 131 of the electrode terminal 130 is inserted is formed in a substantially central part of a rectangular substantially plate-like member. The shaft 131 is inserted into the through hole 150a and caulked, whereby the lower gasket 150 is fixed to the lid 120. The lower gasket 150 is formed using a resin such as PP, PE, PPS, PET, PEEK, PFA, PTFE, PBT, or PES.

[2. Configuration of Spacer]

Figure 4:
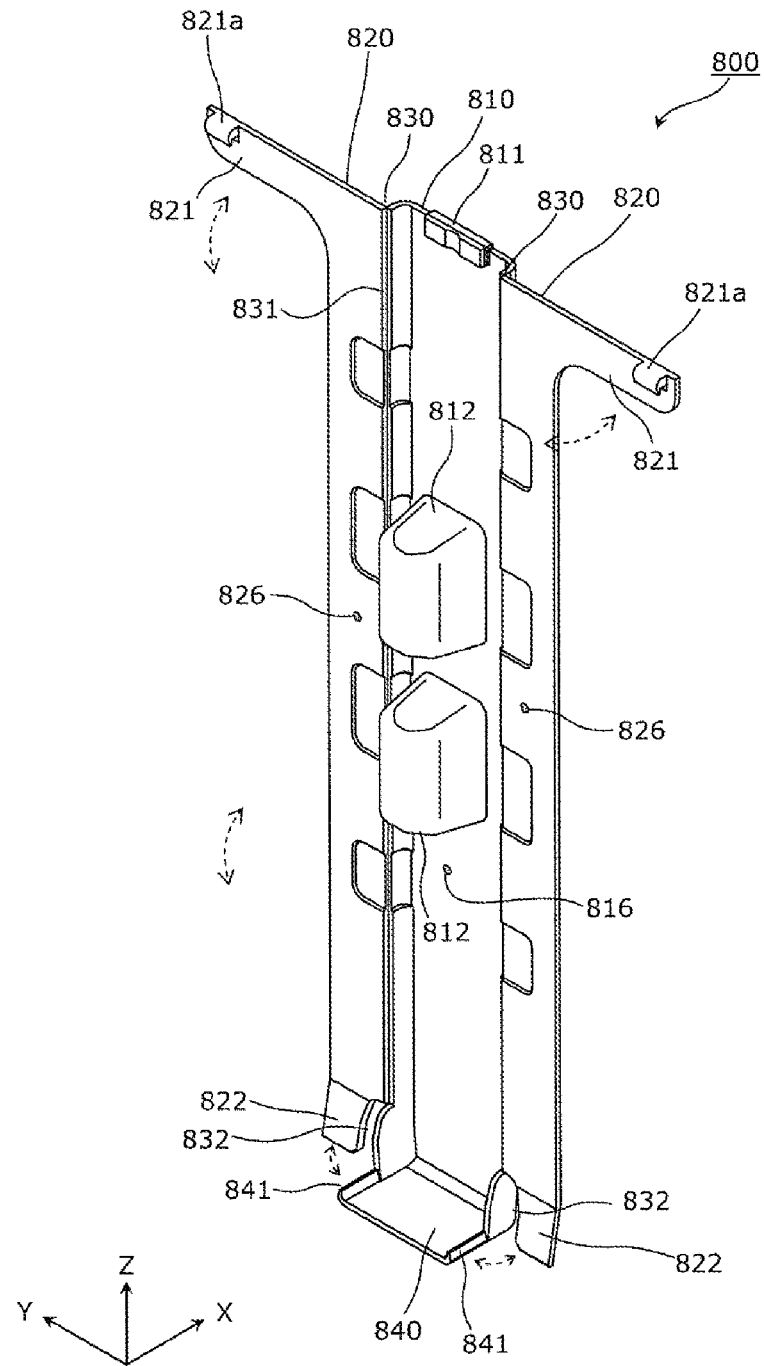
FIG. 4 is a perspective view illustrating a spacer according to the embodiment, with two side portions opened.
Figure 5:
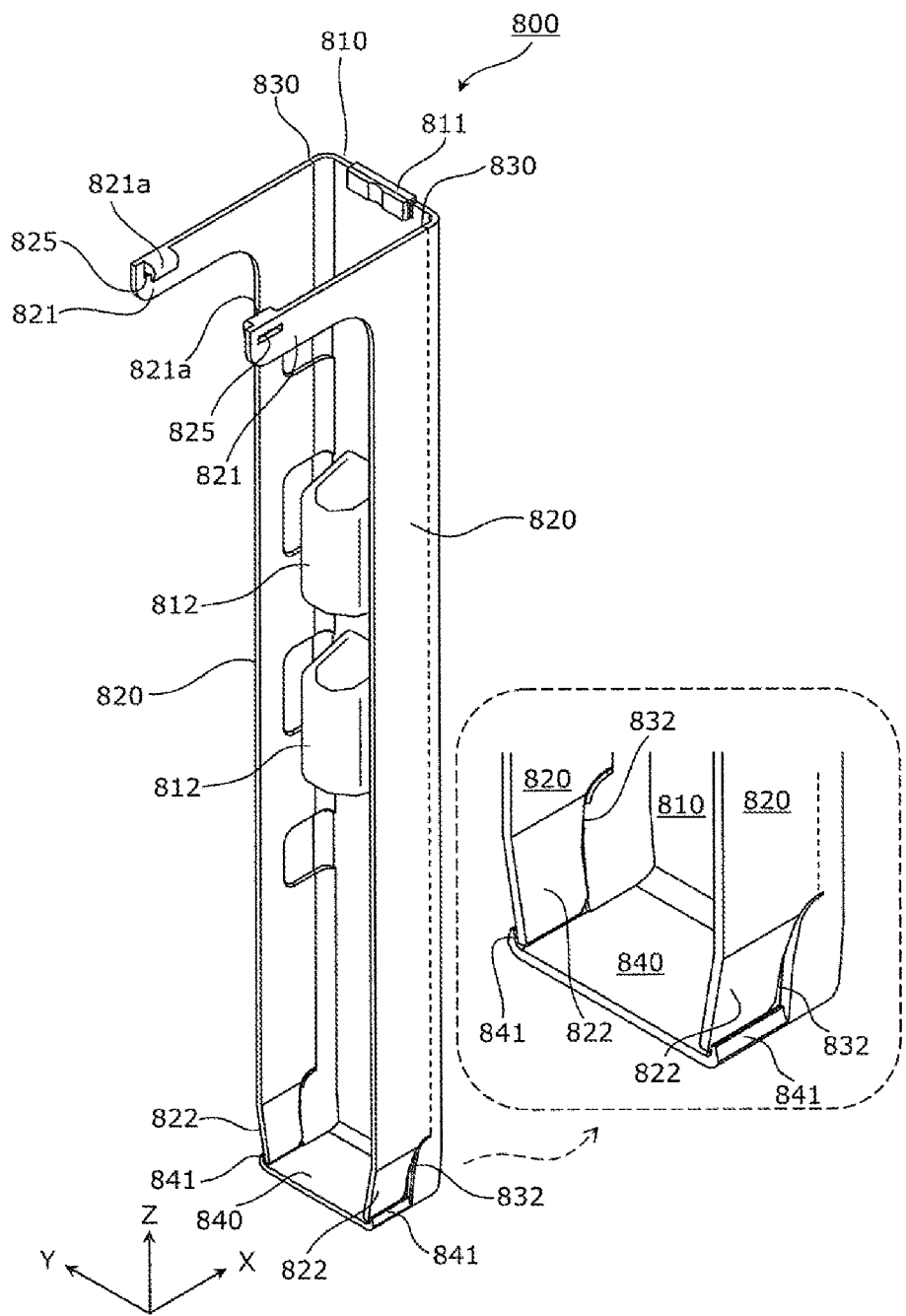
FIG. 5 is a perspective view illustrating a spacer according to the embodiment, with two side portions closed.

Next, the structure of the spacer 800 will be described with reference to FIGS. 4 and 5. FIG. 4 is a perspective view illustrating the spacer 800 according to the embodiment, with two side portions 820 opened. FIG. 5 is a perspective view illustrating the spacer 800 according to the embodiment, with two side portions 820 closed. Specifically, FIG. 5 illustrates the shape of the spacer 800 when the spacer 800 is attached to the electrode assembly 200, and FIG. 4 illustrates a state where the side portions 820 on both sides of a rear portion 810 are rotated 90° outward with respect to the rear portion 810 in the spacer 800 of FIG. 5. As for the connection 830 on the Y-axis minus side, the placement position on the side portion 820 is indicated by a straight dotted line. FIGS. 4 and 5 illustrate the spacer 800 on the X-axis plus side out of the two spacers 800 in FIG. 2. The configuration of the spacer 800 and the like will be mainly described below. The spacer 800 on the X-axis minus side has the same structure as on the X-axis plus side of the spacer 800.

As illustrated in these figures, the spacer 800 has the rear portion 810, the two side portions 820, the two connections 830, and a bottom portion 840. Here, as illustrated in FIGS. 2, 4, and 5, the rear portion 810 is a region constituting the rear surface part of the spacer 800, and is disposed to face the electrode-assembly end portion 220. That is, in the present embodiment, the rear portion 810 is disposed to face the end portion of the electrode assembly 200 in the direction of the winding axis W. The rear portion 810 is disposed to face the first wall 111 forming the short side surface of the case 100. The side portion 820 is a region constituting a side surface part of the spacer 800 and is extended in a direction along the side surface of the electrode assembly 200. The side portion 820 is disposed to face the second wall 112 forming the long side surface of the case 100. The connection 830 is a hinge portion that rotatably connects the side portion 820 to the rear portion 810. The bottom portion 840 is a region constituting a bottom surface part of the spacer 800 and is connected to the rear portion 810 and disposed adjacent to the side portion 820. The bottom portion 840 is disposed at a position facing the third wall 113 which is the bottom wall of the case 100.

[2-1. Structure of the Rear Portion]

The rear portion 810 is a substantially planar region parallel to the YZ plane and extending in the Z-axis direction, and has a convex part projecting toward the electrode assembly 200. Specifically, the rear portion 810 has a rear convex part 812 projecting toward the innermost periphery of the wound electrode assembly 200.

At the end portion of the rear portion 810 on the lid 120 (cf. FIG. 3) side, a projection 811 projecting toward the lid 120 (the Z-axis plus side) is formed. In the present embodiment, the projection 811 is formed so as to project also toward the electrode assembly 200 (the X-axis minus side). The details of the projection 811 will be described later with reference to FIG. 10.

[2-2. Configuration of Side Portion]

The side portion 820 is a substantially planar region extending in the Z-axis direction and connected to the rear portion 810 through the connection 830. As illustrated in FIGS. 4 and 5, the side portion 820 is rotatable with respect to the rear portion 810. In the present embodiment, the side portions 820 are disposed at both ends of the rear portion 810 in the Y-axis direction. However, since the two side portions 820 have a common configuration, one side portion 820 will be described below.

In the present embodiment, the side portion 820 has a convex part projecting toward the electrode assembly 200. Specifically, the side portion 820 has an engagement portion 821a formed to project from the front surface of the side portion 820. The engagement portion 821a engages with another member disposed in the case 100. In the present embodiment, the engagement portion 821a engages with the lower gasket 150 which is another member in a state where the side portion 820 is closed (cf. FIG. 5). An opening 825 is formed lateral to the engagement portion 821a. The opening 825 is a hole used at the time of confirming the engagement state between the engagement portion 821a and the lower gasket 150. The details of the engagement portion 821a will be described later with reference to FIGS. 7 to 9.

In the present embodiment, the side portion 820 has a cover portion 821 covering the side surface of the fixed end portion 310 of the current collector 300, and the engagement portion 821a is provided on the cover portion 821. The cover portion 821 can also be expressed as being extended from the rear portion 810. A positional relationship between the cover portion 821 and the fixed end portion 310 of the current collector 300 will be described later with reference to FIG. 11.

As illustrated in FIG. 5, in a state where the side portion 820 is closed, a side end portion 822, which is the end portion of the side portion 820 on the bottom portion 840 side, is locked to a locking portion 841 provided on the bottom portion 840. A notch 832 extended in a direction away from the bottom portion 840 (Z-axis plus direction) is formed at the end portion on the bottom portion 840 side between the side portion 820 and the rear portion 810. That is, the side end portion 822 is formed so as to be movable with respect to the bottom portion 840 and not to be restricted from the rear portion 810.

[2-3. Configuration of Connection]

The connection 830 is a region extended in the Z-axis direction between the rear portion 810 and the side portion 820, and is a region for rotatably connecting the rear portion 810 and the side portion 820. In the present embodiment, the connection 830 is formed thinner than the other portions, so that the side portion 820 is rotatably connected to the rear portion 810. The connection 830 may rotatably connect the side portion 820 to the rear portion 810 in a structure except for the thin structure. For example, in the spacer 800, the connection 830 may be achieved by forming a plurality of holes arranged in the Z-axis direction between the rear portion 810 and the side portion 820.

In the present embodiment, in the spacer 800, the connection 830 is disposed at the position facing the second wall 112, but the connection 830 may be disposed at a position facing the first wall 111. That is, the placement of the connection 830 at or near the boundary between the first wall 111 and the second wall 112 generates convenience such as the ease of wrapping the end portion of the electrode assembly 200 obtained by, for example, closing the side portion 820 in the open state. Note that the spacer in which the connection 830 is disposed at the position facing the first wall 111 will be described later with reference to FIG. 16.

[2-4. Configuration of Bottom Portion]

The bottom portion 840 is a rectangular and planar region disposed at and connected to the end portion of the rear portion 810 on the Z-axis minus side and extending in the X-axis minus direction from the end portion of the rear portion 810.

The bottom portion 840 has locking portions 841 for locking the side end portions 822 which are end portions of the side portions 820 on both sides in the Y-axis direction. In the present embodiment, the locking portion 841 is achieved by a hook erected from the bottom portion 840 toward the side portion. That is, the side end portions 822 are locked to the hooks (locking portions 841) provided at both ends of the bottom portion 840 in the Y-axis direction, thereby restricting the positions of the side end portions 822 having a high degree of freedom of movement. There is no particular limitation to a method in which the locking portion 841 locks the side end portion 822. For example, the side end portion 822 may be locked by the locking portion 841 by insertion of the front end of the side end portion 822 into a groove or a slit as the locking portion 841.

Here, the bottom portion 840 is disposed such that an angle formed by the rear portion 810 and the bottom portion 840 becomes larger than 90°. With this configuration, at the time of disposing the spacer 800 on the electrode assembly 200, it is possible to prevent the interference of the bottom portion 840 with the electrode assembly 200. It is thereby possible to prevent damage to the electrode assembly 200. In particular, when the spacer 800 is formed using a resin, at the time of forming the bottom portion 840, the angle formed by the rear portion 810 and the bottom portion 840 becomes smaller than 90° due to the resin pulling the portions, and in many cases, the bottom portion 840 has a shape to easily interfere with the electrode assembly 200. Therefore, the effect of making the angle between the rear portion 810 and the bottom portion 840 larger than 90° is high.

When the angle formed by the rear portion 810 and the bottom portion 840 of the spacer 800 is too large, the spacer 800 cannot completely cover the lower end portion of the electrode assembly 200, and the insulation between the electrode assembly 200 and the case 100 may be lowered. When the bottom portion 840 projects downward, space saving is also affected. Thus, the angle formed by the rear portion 810 and the bottom portion 840 of the spacer 800 is preferably 100° or less, more preferably 95° or less, and still more preferably 93° or less, so that the deterioration in insulation between the electrode assembly 200 and the case 100 can be prevented, or space can be saved.

[2-5. Spacer Producing Method]

The spacer 800 having the above configuration is produced by resin molding using a mold, for example. For this reason, an inflow mark, which is a mark of an inlet (gate) for a resin or a material mainly formed using a resin (resin material), is formed in the spacer 800. Specifically, as illustrated in FIG. 4, an inflow mark 826, that is a mark of an inlet (gate) through which the resin material has flowed, is formed on each of the two side portions 820. An inflow mark 816 is also formed on the rear portion 810. That is, the spacer 800 is produced by pouring the resin material into the mold from the gate disposed corresponding to each of the two side portions 820 and the one rear portion 810. Of course, this is not essential, and for example, the entire spacer 800 may be formed using a resin poured from one gate. Only one of the side portion 820 and the rear portion 810 may have an inflow mark. The formation of each of the side portion 820 and the rear portion 810 by using a resin from a unique gate leads to advantages such as that the shapes of the side portion 820 and the rear portion 810 can be made complex, and that it is easy to form the connection 830 which is a thin portion between the side portion 820 and the rear portion 810.

In the present embodiment, there is no thin portion between the bottom portion 840 and the rear portion 810, so that the bottom portion 840 is formed using the resin material having flowed in from the position of the inflow mark 816 formed on the rear portion 810. The position and the number of the gates may be determined as appropriate in accordance with the shape and size of the spacer 800, the type of the resin material that is used as the material, or the like. Hence the positions and numbers of the inflow marks 816, 826 are not limited to the positions and numbers illustrated in FIG. 4.

[3. Procedure for Attaching Spacer]

Figure 6A:
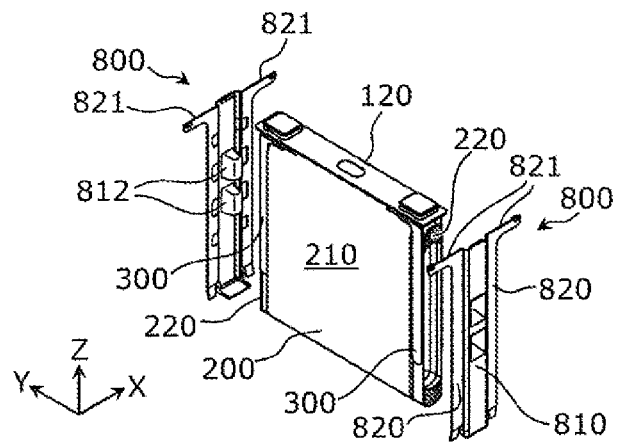
FIG. 6A is a first view for explaining a procedure for attachment of the spacer to the electrode assembly according to the embodiment.
Figure 6B:
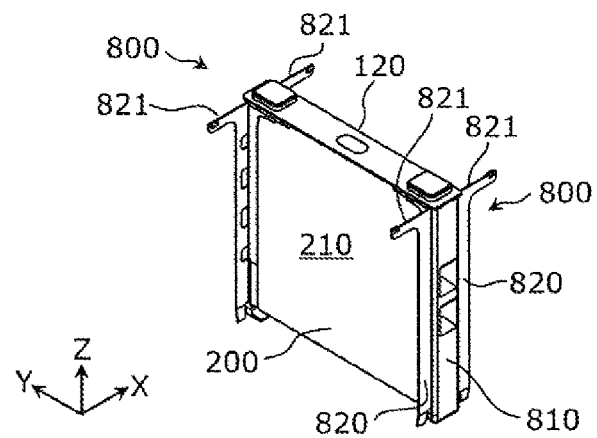
FIG. 6B is a second view for explaining the procedure for attachment of the spacer to the electrode assembly according to the embodiment.
Figure 6C:
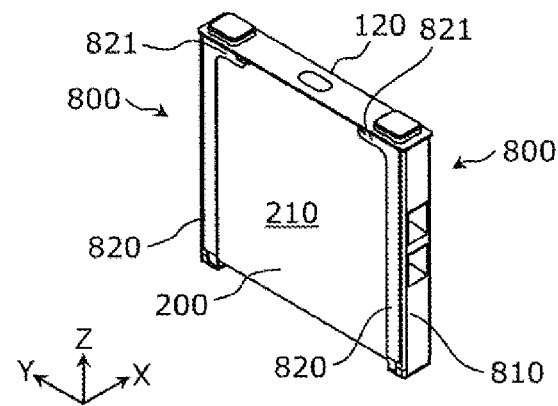
FIG. 6C is a third view for explaining the procedure for attachment of the spacer to the electrode assembly according to the embodiment.

Next, a procedure for attaching the spacer 800 configured as described above to the electrode assembly 200 will be described with reference to FIGS. 6A to 6C. FIG. 6A is a first view for explaining the procedure for attaching the spacer 800 to the electrode assembly 200, FIG. 6B is a second view for explaining the same attachment procedure, and FIG. 6C is a third view for explaining the same attachment procedure.

Since the spacers 800 attached to both ends of the electrode assembly 200 in the winding-axis direction are attached to the electrode assembly 200 in the same manner, a procedure for attaching one spacer 800 will be described below. At the point in time of attaching the spacer 800 to the electrode assembly 200, the current collector 300 fixed to the lid 120 together with the electrode terminal 130 and the like has already been joined to each of the two end portions (electrode-assembly end portions 220) of the electrode assembly 200. Although not illustrated in FIGS. 6A to 6C, the insulating sheet 600 (cf. FIG. 2) is held by a manufacturing machine or the like, so that the spacer 800 is attached to the electrode assembly 200 with the insulating sheet 600 temporarily fixed to the electrode assembly 200. An adhesive tape, for example, may be used for temporarily fixing the insulating sheet 600 to the electrode assembly 200.

When the spacer 800 is attached to the electrode assembly 200, first, as illustrated in FIG. 6A, the spacer 800 is disposed in such an orientation that the rear convex part 812 faces the electrode-assembly end portion 220, with the side portions 820 open. Next, as illustrated in FIG. 6B, the spacer 800 is moved toward the electrode assembly 200 such that the rear convex part 812 is inserted into the innermost periphery of the electrode assembly 200. Thereafter, by closing (rotating the side portion 820 toward the electrode assembly 200), the engagement portion 821a (cf. FIG. 4) engages with the lower gasket 150 fixed to the lid 120, and the side end portion 822 (cf. FIG. 4) engages with the locking portion 841 of the bottom portion 840. That is, the side portion 820 is maintained in a closed state, and in this state, the electrode assembly 200 to which the spacer 800 is attached is inserted into the case body 110 (cf. FIG. 2). In the state where the side portion 820 is closed, the edge of the insulating sheet 600 on the electrode-assembly end portion 220 side is disposed inside the side portion 820, so that the edge of the insulating sheet 600 is not caught by the case body 110 when the electrode assembly 200 is inserted into the case body 110.

[4. Details of Engagement Portion]

Figure 7:
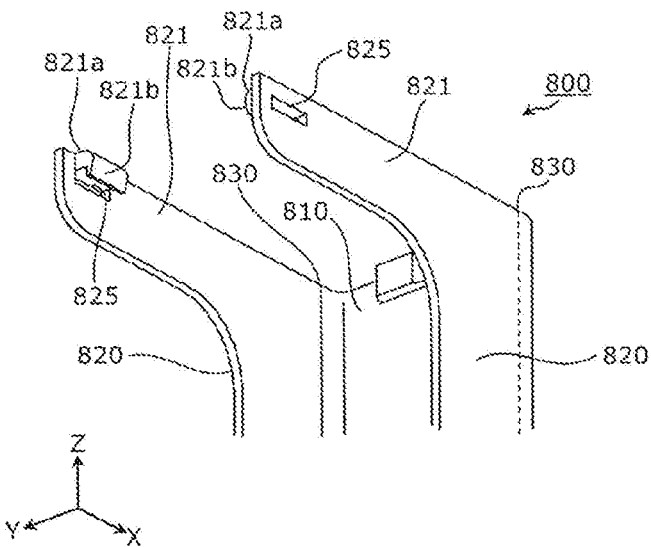
FIG. 7 is a perspective view illustrating an engagement portion of the spacer and its periphery according to the embodiment.
Figure 8:
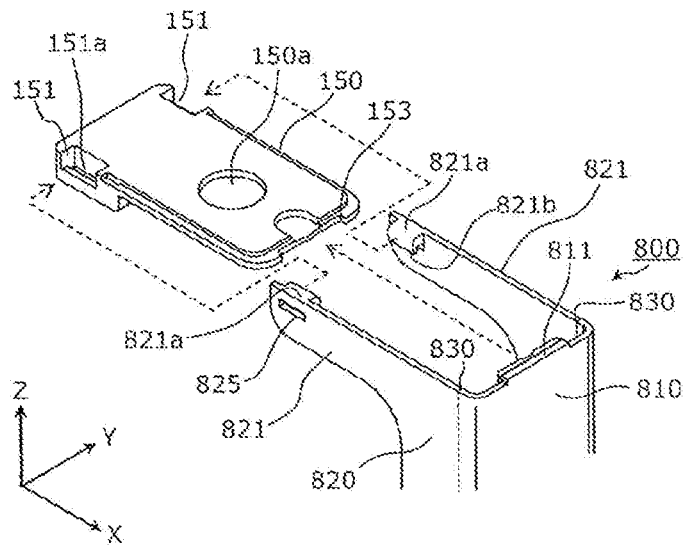
FIG. 8 is a perspective view illustrating a structural relationship between the engagement portion and a lower gasket according to the embodiment.
Figure 9:
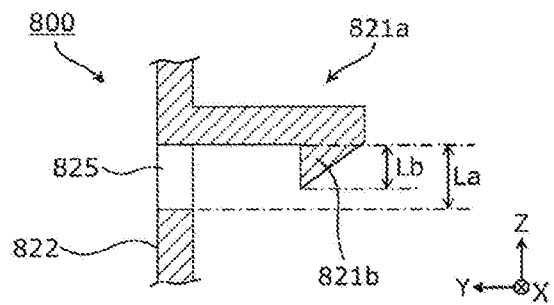
FIG. 9 is a cross-sectional view of the engagement portion and a through hole according to the embodiment.

Next, the details of the engagement portion 821a of the spacer 800 attached to the electrode assembly 200 in the procedure as described above will be described with reference to FIGS. 7 to 9. FIG. 7 is a perspective view illustrating the engagement portion 821a of the spacer 800 and its periphery according to the embodiment. FIG. 8 is a perspective view illustrating a structural relationship between the engagement portion 821a and the lower gasket 150 according to the embodiment. FIG. 9 is a cross-sectional view of the engagement portion 821a and the opening 825 according to the embodiment. FIG. 9 illustrates a cross section of the engagement portion 821a and the opening 825 in the YZ plane passing through the engagement portion 821a on the Y-axis plus side in FIG. 8.

As illustrated in these drawings, the engagement portion 821a has a hook 821b. The hook 821b is formed so as to project toward the opening 825 provided lateral to the engagement portion 821a when viewed from the projecting direction of the engagement portion 821a. In the present embodiment, as illustrated in FIGS. 7 and 8, the opening 825 is provided at a position below the engagement portion 821a of the spacer 800, and the engagement portion 821a has a hook 821b projecting downward.

In the present embodiment, the lower gasket 150 is formed with an engagement recess 151 that engages with the engagement portion 821a, and the engagement recess 151 has a hook insertion portion 151a into which the hook 821b is inserted. Thus, when the engagement portion 821a engages with the engagement recess 151, the hook 821b is caught by the hook insertion portion 151a, and as a result, the engagement recess 151 of the engagement portion 821a is prevented from coming out.

Since the engagement portion 821a is provided on the side portion 820 rotatable with respect to the rear portion 810, the engagement portion 821a can be inserted into the engagement recess 151 from the front of the engagement recess 151 of the lower gasket 150 (from the side in the Y-axis direction).

The hook 821b has a size that fits within the placement region of the opening 825 when viewed from the projecting direction of the engagement portion 821a. That is, as illustrated in FIG. 9, a projecting length Lb of the hook 821b is smaller than a vertical width La of the opening 825 in terms of the cross section. Therefore, the hook 821b can be formed by using a protrusion part that forms the opening 825 in the mold when the spacer 800 is produced by resin molding.

As described above, the opening 825 is a hole used at the time of confirming the engagement state between the engagement portion 821a and the lower gasket 150. After the attachment of the spacer 800 to the electrode assembly 200 in the procedure illustrated in FIGS. 6A to 6C, an image of a part of the lower gasket 150 visible from the opening 825 is captured. By analyzing the imaging data as thus obtained, it is possible to determine whether or not the engagement portion 821a is in correct engagement with the engagement recess 151 of the lower gasket 150.

When the engagement portion 821a of the spacer 800 is engaged with the lower gasket 150, a part projecting to the lower gasket 150 (the X-axis minus side) in the projection 811 provided at the upper end of a rear portion 810 of the spacer 800 engages with a rear-side recess 153 of the lower gasket 150. Thus, for example, the position of the spacer 800 is restricted in the lateral direction (Y-axis direction), whereby it is possible to enhance the stability of the position of the spacer 800.

[5. Relationship Between Projection of Rear Portion and Lid]

Next, a structural relationship between the projection 811 provided at the upper end of the rear portion 810 of the spacer 800 and the lid 120 will be described with reference to FIG. 10.

Figure 10:
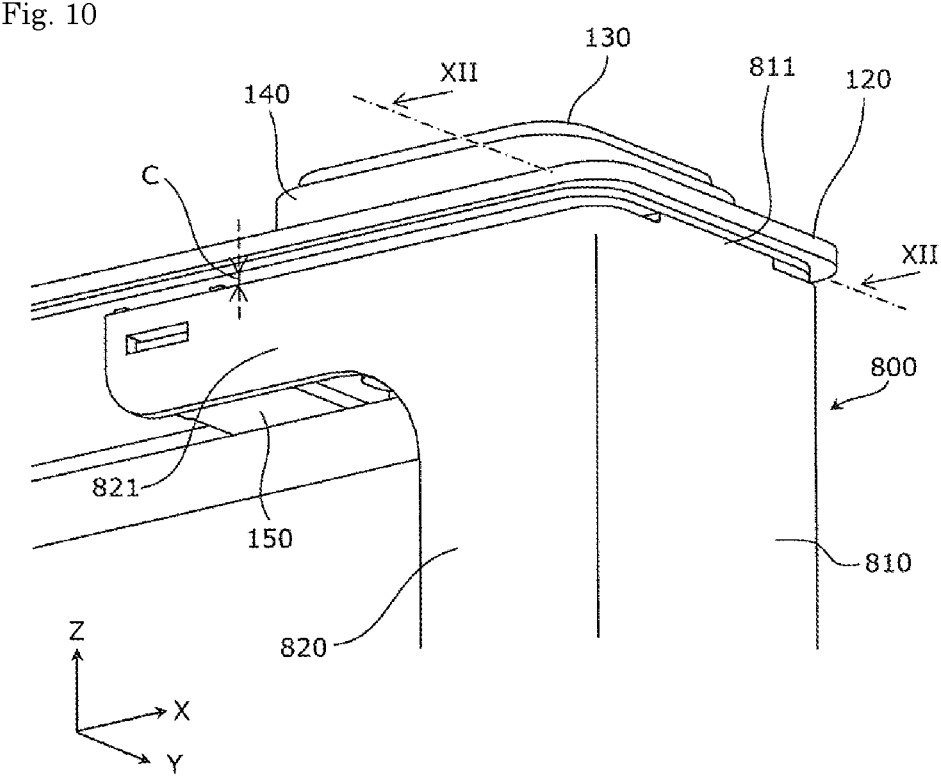
FIG. 10 is a perspective view illustrating a structural relationship between a projection of the spacer and a lid according to the embodiment.

FIG. 10 is a perspective view illustrating a structural relationship between the projection 811 of the spacer 800 and the lid 120 according to the embodiment. As illustrated in FIG. 10, the projection 811 projecting toward the lid 120 is formed at the upper end portion of the rear portion 810 of the spacer 800, that is, at the end portion on the lid 120 side. The upper end surface of the projection 811 comes into contact with the lid 120 to restrict the upward movement of the spacer 800. In this state, as illustrated in FIG. 10, there is a gap between the upper end of the side portion 820 of the spacer 800 and the lid 120, the gap having a distance C substantially the same as the projecting length of the projection 811. Therefore, when the side portion 820 is rotated so as to be closed at the time of attaching the spacer 800 to the electrode assembly 200 (cf. FIGS. 6B and 6C), the side portion 820 can be closed without causing the upper end of the side portion 820 to interfere with the lid 120. That is, each of the pair of engagement portions 821a (cf. FIG. 9) of the spacer 800 in the present embodiment can be easily engaged with the lower gasket 150.

In a state where the spacer 800 is attached to the electrode assembly 200 (cf. FIG. 6C), the projection 811 of the spacer 800 is in contact with the lid 120. Therefore, at the time of inserting the spacer 800 into the case body 110 together with the electrode assembly 200, the lid 120 is pushed toward the case body 110, so that the electrode assembly 200 and the spacer 800 can be reliably pushed into the case body 110 while the displacement of the spacer 800 with respect to the electrode assembly 200 is prevented. Since the upper end of the spacer 800 exists at a position lower than the upper end of the projection 811 (a position in the Z-axis minus direction), the occurrence of such a situation that the upper end of the spacer 800 is caught between the case body 110 and the lid 120 is prevented when the lid 120 closes the opening of the case body 110. Therefore, for example, the case body 110 and the lid 120 can be welded with high accuracy. Since the contact area between the lid 120 and the spacer 800 is relatively small, heat in welding the case body 110 and the lid 120 is hardly conducted from the lid 120 to the spacer. This reduces the possibility that the spacer 800 is damaged by heat during welding, for example.

[6. Positional Relationship Between Cover Portion and Current Collector]

Next, a positional relationship between the cover portion 821 of the spacer 800 and the fixed end portion 310 of the current collector 300 according to the embodiment will be described with reference to FIGS. 11 and 12.

Figure 11:
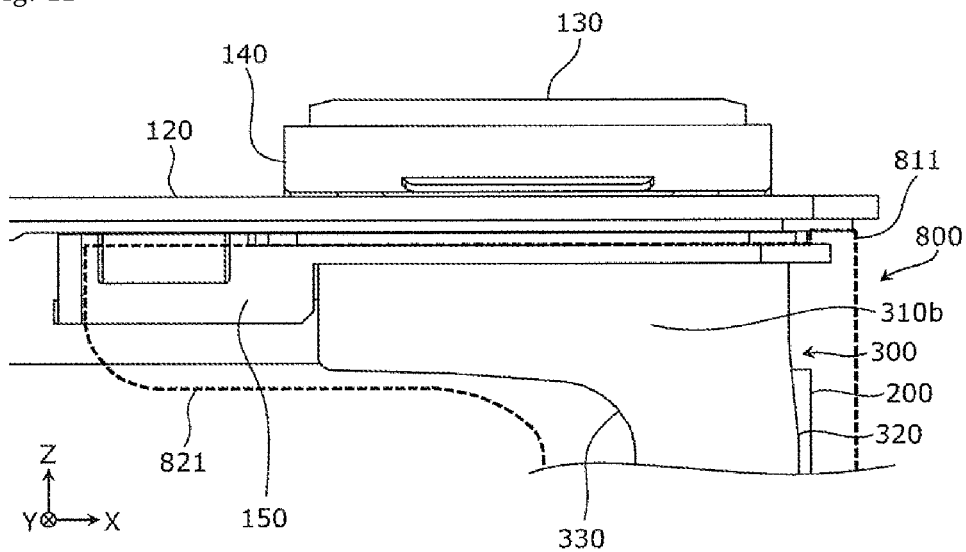
FIG. 11 is a side view illustrating a placement range of a cover portion of the spacer according to the embodiment.
Figure 12:
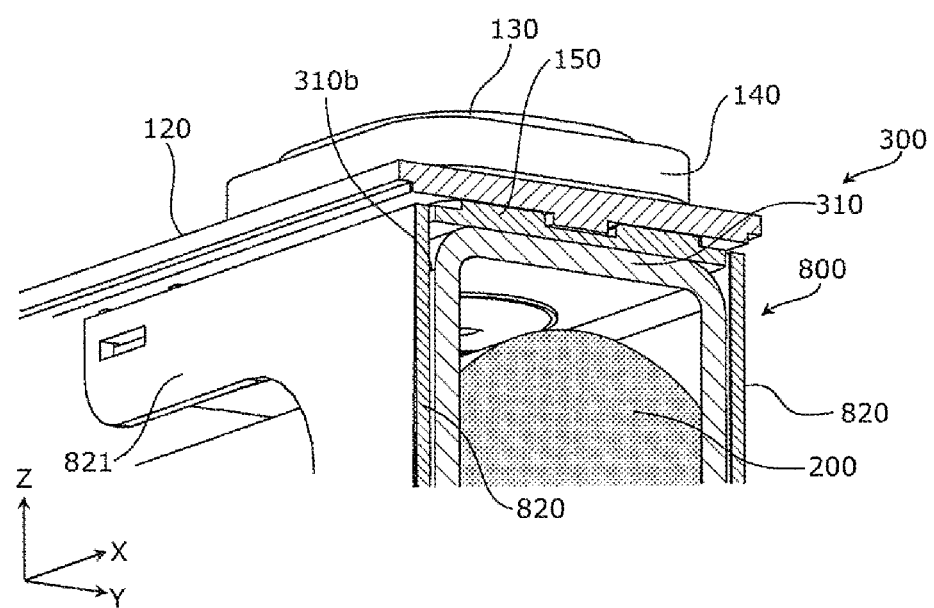
FIG. 12 is a partially cutaway perspective sectional view illustrating the placement range of the cover portion of the spacer according to the embodiment.

FIG. 11 is a side view illustrating the placement range of the cover portion 821 of the spacer 800 according to the embodiment. In FIG. 11, in order to clearly show the placement range of the cover portion 821, the spacer 800 is illustrated through, and the outer shape of the spacer 800 is indicated by a dotted line. FIG. 12 is a partially cutaway perspective sectional view illustrating the placement range of the cover portion 821 of the spacer 800 according to the embodiment. FIG. 12 illustrates the energy storage device 10 cut along the YZ plane passing through a line XII-XII illustrated in FIG. 10. The case body 110 is illustrated in neither FIG. 11 nor FIG. 12.

As illustrated in FIGS. 10 and 11, in a state where the spacer 800 is attached to the electrode assembly 200, the cover portion 821 which is a part of the side portion 820 of the spacer 800 covers a side surface 310b of the fixed end portion 310 of the current collector 300 in the Y-axis direction. That is, the upper surface (the surface on the lid 120 side) of the fixed end portion 310 is covered with the lower gasket 150, and the side surface 310b of the fixed end portion 310 in the electrode plate stacking direction in the electrode assembly 200 is covered with the cover portion 821 that is separate from the lower gasket 150. That is, the cover portion 821 prevents contact (i.e., conduction.) between the side surface 310b and the case body 110. This eliminates the need for the lower gasket 150 to have a wall covering the side surface 310b of the fixed end portion 310. Therefore, as illustrated in FIG. 11, the lateral width (width in the Y-axis direction) of the fixed end portion 310 can be made substantially the same as the lateral width of the lower gasket 150. In other words, the size of the fixed end portion 310 in a plan view can be made relatively large. Thereby, joining work such as caulking work of the tip of the electrode terminal 130 is facilitated.

Suppose that the lower gasket 150 has a wall covering the side surface 310b of the fixed end portion 310, the wall and the cover portion 821 of the spacer 800 improve the reliability of insulation between the fixed end portion 310 and the case body 110.

In the present embodiment, the current collector 300 has a reinforcing rib 330 that connects the fixed end portion 310 and the leg 320 in an oblique direction in a side view (when viewed from the Y-axis). The reinforcing rib 330 is a region for reinforcing the base part of the leg 320 and has a function of preventing deformation (rotation about the Z-axis) of the leg 320 in the X-axis direction. Since the cover portion 821 according to the present embodiment can cover the reinforcing rib 330 as illustrated in FIG. 11, for example, a relatively high wall for covering the reinforcing rib 330 need not be formed in the lower gasket 150.

[7. Description of Effects]

As described above, the energy storage device 10 according to the present embodiment includes the electrode assembly 200, the case 100 housing the electrode assembly 200, and the spacer 800 which is a side spacer disposed between the electrode assembly 200 and the case 100. The spacer 800 has the rear portion 810 disposed to face the end portion of the electrode assembly 200 (the electrode-assembly end portion 220 in the present embodiment), the side portion 820 extended in a direction along the side surface of the electrode assembly 200, and the connection 830 that rotatably connects the side portion 820 to the rear portion 810.

With this configuration, in the configuration in which the spacer 800 being the side spacer has the rear portion 810 and the side portion 820, the side portion 820 is rotatably connected to the rear portion 810. Thus, at the time of attaching the spacer 800 to the electrode assembly 200, the side portion 820 can be brought into contact with the electrode assembly 200 by rotating the side portion 820 toward the electrode assembly 200. Hence the bending, breakage, or the like of the electrode plate due to interference of the side portion 820 with the electrode plate of the electrode assembly 200 hardly occurs. Here, when the length of the leg 320 joined to the electrode-assembly end portion 220 is small, a part which easily spreads outward in the electrode-assembly end portion 220 is relatively large. Even in such an instance, in the spacer according to the present embodiment, the side portion 820 is rotated toward the electrode-assembly end portion 220 to come into contact with the electrode-assembly end portion 220 from the side. Thus, even if the length of the leg 320 of the current collector 300 is smaller than the length illustrated in FIG. 2, a problem such as bending or breakage of the electrode plate hardly occurs. That is, in the energy storage device 10 according to the present embodiment, on at least two surfaces, the work of attaching the spacer 800, which can insulate between the electrode assembly 200 and the case 100 and prevent the movement of the electrode assembly 200, to the end portion of the electrode assembly 200 is facilitated.

Even if the electrode assembly 200 is swollen more than the initial state at the time of attaching the spacer 800 to the electrode assembly 200, the spacer 800 can be attached to the end portion of the electrode assembly 200 without difficulty because the side portion 820 is rotatable. Further, at the time of inserting the electrode assembly 200 into the case body 110, the electrode assembly 200 is guided by the rear portion 810 and the side portion 820 forming the surfaces along the insertion direction, so that the insertion can be performed smoothly.

As described above, the energy storage device 10 according to the present aspect is the energy storage device 10 including the side spacer (spacer 800) and is the energy storage device 10 that can be manufactured efficiently.

In the energy storage device 10 according to the present embodiment, the case 100 has the first wall 111 and the second wall 112 adjacent to the first wall 111. The rear portion 810 is disposed to face the first wall 111, the side portion 820 is disposed to face the second wall, and the connection 830 is disposed to face the end portion of the first wall 111 or the end portion of the second wall 112. That is, the connection 830 is disposed at or near the boundary between the first wall 111 and the second wall 112.

With this configuration, for example, the connection 830 is located at a corner part where the rear portion 810 and the side portion 820 abut against each other, and hence the end portion of the electrode assembly 200 is easily covered with the spacer 800.

More specifically, in the present embodiment, the connection 830 is disposed to face the second wall 112. In the spacer 800, the corner between the rear portion 810 and the side portion 820 is a part subjected to stress, and hence when the connection 830 is disposed at the position of the corner, the connection 830 is damaged easily. Therefore, the connection 830 is disposed to face the second wall 112. Accordingly, the connection 830 is disposed not at the corner but on the side surface 820 side of the spacer 800 rather than at the corner, so that the damage of the connection 830 can be prevented. Further, with the corner being disposed on the rear portion 810 side, the strength of the rear portion 810 can be increased. It is thereby possible to prevent damage to the spacer 800. Since the connection 830 only need be formed at the plane part rather than at the corner, the connection 830 can be easily formed, and the spacer 800 can be easily manufactured.

In the energy storage device 10 according to the present embodiment, the spacer 800 has a convex part projecting toward the electrode assembly 200. In the present embodiment, the engagement portion 821a, the rear convex part 812, and the like are exemplified as the convex parts.

Here, since the spacer 800 according to the present embodiment can be formed with the side portion 820 open with respect to the rear portion 810, it is also possible to form a convex part having a complex shape. Thus, the spacer 800 can have a convex part (engagement portion 821a, etc.) suitable for a predetermined purpose such as stabilization of the position of the spacer 800. That is, it is possible to produce, with comparative ease, the spacer 800 excellent in functions such as preventing the movement of the electrode assembly 200.

In the energy storage device 10 according to the present embodiment, the spacer 800 is formed using the resin material, and the rear portion 810 has the inflow mark 816 of the resin material. The side portion 820 has the inflow mark 826 of the resin material.

With this configuration, each of the rear portion 810 and the side portion 820 is formed using the resin material that flows into the mold from a different gate. This enables each of the rear portion 810 and the side portion 820 to be formed into a complex shape. The movement of the resin material between the space for the rear portion 810 and the space for the side portion 820 in the mold may be unnecessary or small, whereby, for example, the space (a gap in the mold) for the connection 830 can be narrowed. As a result, the connection 830 which rotatably supports the side portion 820 can be easily formed thin. That is, it is possible to produce, with comparative ease, the spacer 800 that is easily attached to the electrode assembly 200 or is excellent in functions such as preventing the movement of the electrode assembly 200.

In the energy storage device 10 according to the present embodiment, the electrode assembly 200 is formed by the electrode plate and the separator being wound, and the rear portion 810 is disposed to face the end portion (i.e., the electrode-assembly end portion 220) of the electrode assembly 200 in the direction of the winding axis W.

With this configuration, the electrode-assembly end portion 220, which is a part where the edge of the electrode plate and the edge of the separator are stuck and which is a relatively weak portion, can be protected by the spacer 800.

At the time of attaching the spacer 800 to the end portion of the electrode-assembly end portion 220, the edge of the separator or the electrode plate can be attached without causing the side portion 820 to be turned up.

Here, the wound electrode assembly 200 may increase in thickness due to the occurrence of spring back. In this instance, when the side portion is a spacer fixed to the rear portion, a difficulty arises in attaching the spacer to the electrode assembly 200, and as a result, the possibility of damage to the spacer or the electrode assembly 200 increases. In this regard, in the spacer 800 according to the present embodiment, the side portion 820 is rotatable with respect to the rear portion 810, so that the spacer 800 can be attached to the electrode assembly 200 without difficulty while the electrode assembly 200 with increased thickness is pressed by the side portion 820.

[8. First Modification]

Figure 13:
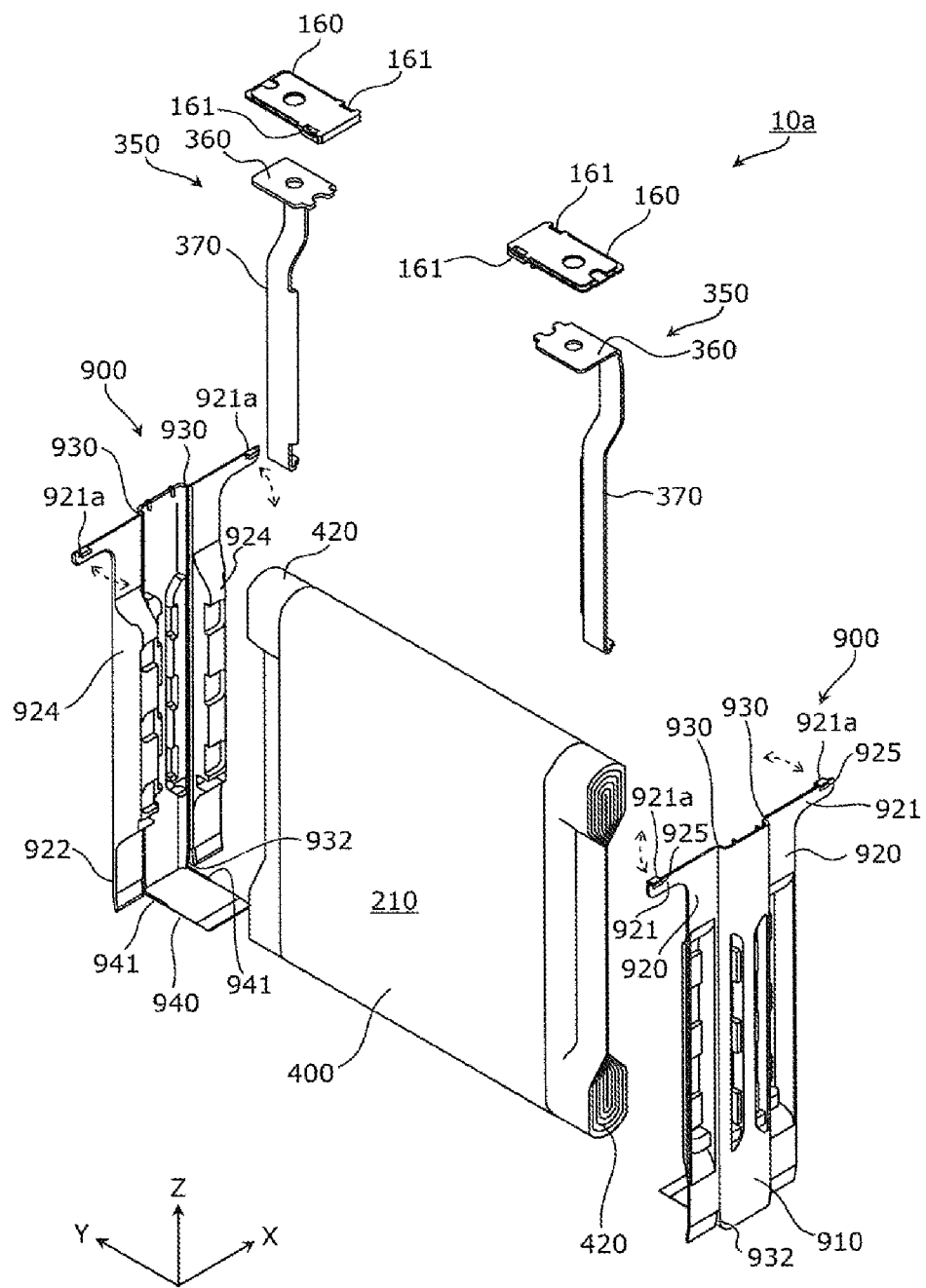
FIG. 13 is an exploded perspective view of some components of an energy storage device according to a first modification of the embodiment.

Next, a first modification of the embodiment will be described with reference to FIG. 13. FIG. 13 is an exploded perspective view of some components of an energy storage device 10a according to the first modification of the embodiment. Specifically, FIG. 13 illustrates an electrode assembly 400, a current collector 350, a lower gasket 160, and a spacer 900 among the components of the energy storage device 10a. That is, the case 100, the electrode terminal 130, the insulating sheet 600, and the like provided in the energy storage device 10a are not illustrated. The spacer 900 is illustrated with a side portion 920 open.

As illustrated in FIG. 13, the current collector 350 in the present modification differs from the current collector 300 in the embodiment in that the current collector has only one leg 370 connected to the electrode assembly 400. Therefore, the electrode assembly 400 has an electrode-assembly end portion 420 with a shape corresponding to this one leg 370. The spacer 900 also has a shape corresponding to only one leg 370. The electrode-assembly end portion 420 is formed so as to be gathered at the center of the electrode assembly 400 in the Y-axis direction, and hence the spacer 900 has a side convex part 924 so as to fill right and left gaps, in the Y-axis direction, of a joint part between the electrode-assembly end portion 420 and the leg 370. However, the spacer 900 is divided into regions of a rear portion 910, two side portions 920, two connections 930, and a bottom portion 940, and this point is common to the spacer 800 according to the embodiment.

Specifically, the spacer 900 has the rear portion 910 disposed to face the end portion of the electrode assembly 400 (the electrode-assembly end portion 420 in the present modification), the side portion 920 extended along the side surface of the electrode assembly 400, the connection 930 that rotatably connects the side portion 920 to the rear portion 910, and the bottom portion 940 disposed to face the third wall 113 which is the bottom wall of the case 100. It is also possible to express that the rear portion 910 is disposed to face the first wall 111 of the case 100 and the side portion 920 is disposed to face the second wall 112.

As illustrated in FIG. 13, the spacer 900 has an engagement portion 921a that engages with another member. Specifically, the lower gasket 160 has a pair of engagement recesses 161. When the pair of side portions 920 of the spacer 900 are closed, the respective engagement portions 921a of the pair of side portions 920 engage with the engagement recesses 161 of the lower gasket 160. At this time, a side end portion 922 of the side portion 920, which is the end portion on the bottom portion 940 side, is locked to a locking portion 941 which is a hook provided on the bottom portion 940. In this state, the end surface of a fixed end portion 360 of the current collector 350 in the electrode plate stacking direction (Y-axis direction) in the electrode assembly 400 is covered with a cover portion 921 of the side portion 920.

An opening 925 is formed lateral to the engagement portion 921a, and the engagement state between the engagement portion 921a and the lower gasket 150 can be confirmed through the opening 925.

A notch 932 extended in a direction away from the bottom portion 940 (Z-axis plus direction) is formed at the end portion on the bottom portion 940 side between the side portion 920 and the rear portion 910. That is, the side end portion 922 is formed so as to be movable with respect to the bottom portion 940 and hardly restrained from the rear portion 910. Similarly to the spacer 800 according to the embodiment, the spacer 900 may have a projection projecting toward the lid 120 at the end portion of the rear portion 910 on the lid 120 side (cf. FIG. 3).

As described above, the energy storage device 10a according to the present modification has the same configuration as that in the embodiment, and as a result, the same effect can be achieved.

[9. Second Modification]

Figure 14A:
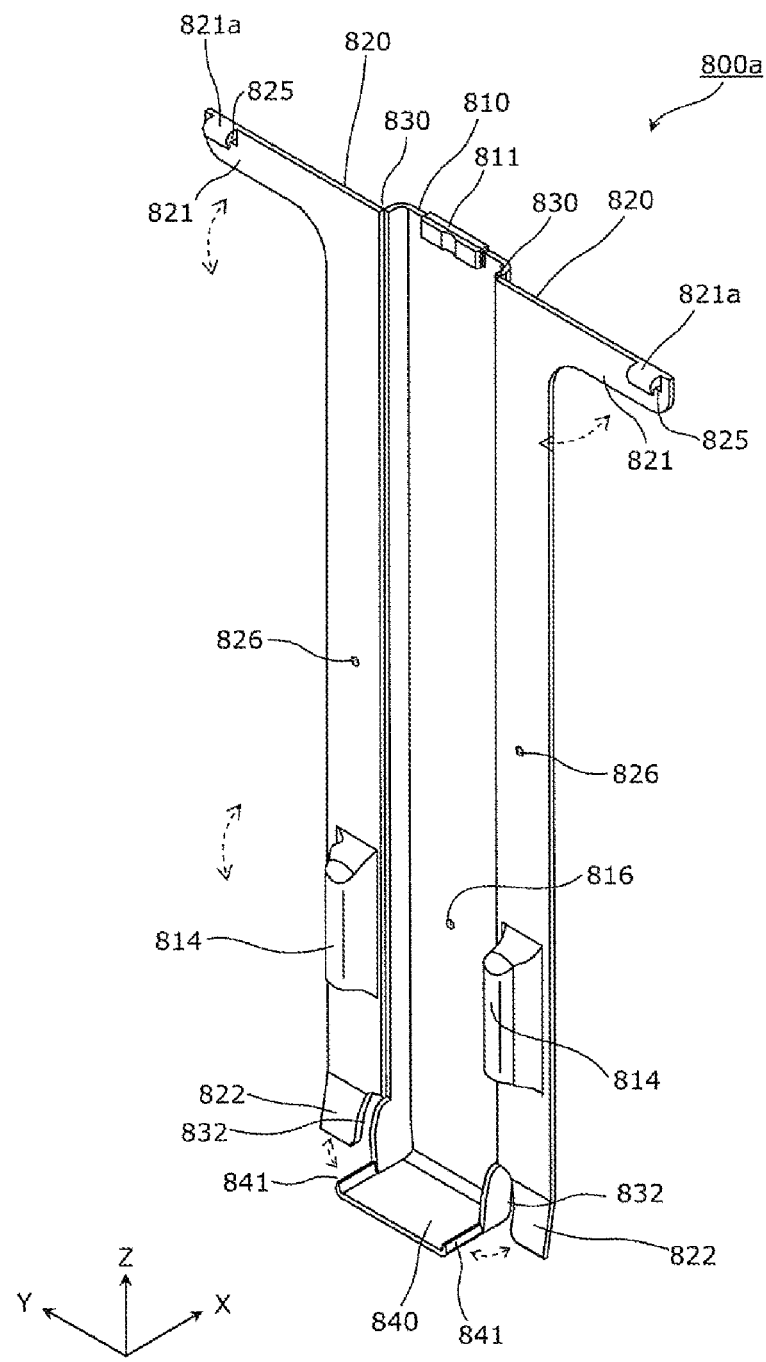
FIG. 14A is a perspective view of a spacer according to a second modification of the embodiment.
Figure 14B:
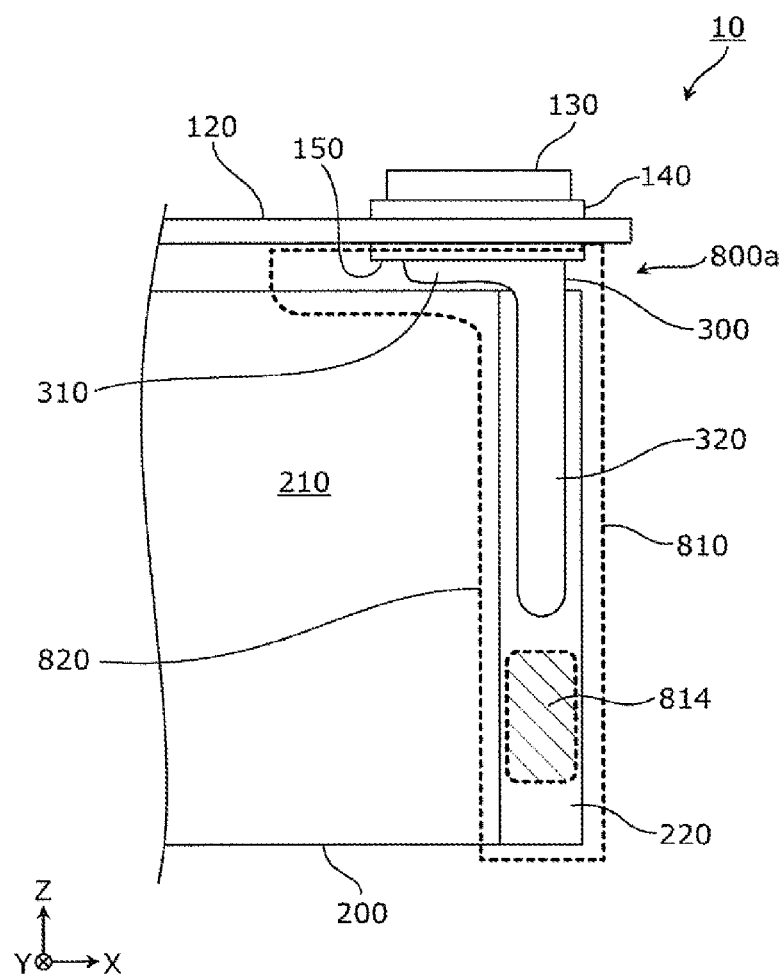
FIG. 14B is a side view illustrating a position of a side convex part of the spacer according to the second modification of the embodiment.

FIG. 14A is a perspective view illustrating a spacer 800a according to a second modification of the embodiment, with two side portions 820 opened. FIG. 14B is a schematic view illustrating a positional relationship between a side convex part 814 of the spacer 800a according to the second modification of the embodiment and the electrode assembly 200. In FIG. 14B, the case 100 is not illustrated. In FIG. 14B, the outer shape of the spacer 800a is illustrated by a dotted line, and hatching is applied to the placement region of the side convex parts 814.

As illustrated in FIG. 14A, the spacer 800a according to the present modification, like the spacer 800 according to the embodiment, has the rear portion 810 disposed to face the end portion of the electrode assembly 200 (the electrode-assembly end portion 220 in the present modification), the side portion 820 extended in a direction along the side surface of the electrode assembly 200, and the connection 830 that rotatably connects the side portion 820 to the rear portion 810.

The spacer 800a further has a convex part projecting toward the side of the electrode assembly 200 and is common to the spacer 800 according to the embodiment in this point. However, the spacer 800a according to the present modification has the side convex part 814, projecting toward the side of the electrode assembly 200, on the side portion 820 and is different from the spacer 800 in this point.

As illustrated in FIG. 14B, the side convex part 814 is disposed below the leg 320 of the current collector 300. Thereby, the side convex parts 814 can press from the side a part in the electrode-assembly end portion 220 which is not joined to the legs 320. That is, the side convex part 814 can press a location of the electrode assembly 200 where the movement restricting effect by the current collector 300 is hardly exerted. Therefore, the spacer 800a can more reliably prevent the movement of the electrode assembly 200.

The lower portion of the wound electrode assembly 200 which is not joined to the current collector 300 is not restricted by the pair of legs 320 and thus tends to be swollen due to spring back. However, by attachment of the spacer 800a to the end portion 220 of the electrode assembly, the side convex part 814 disposed on each of the pair of side portion 820 presses the lower portion of the electrode-assembly end portion 220 of the electrode assembly. This prevents the swelling of the lower portion of the electrode assembly 200, and as a result, it is possible to smoothly insert the electrode assembly 200 into the case body 110. The placement of the side convex parts 814 on the planar side portion 820 prevents the deformation of the side portion 820, thereby improving the accuracy of the shape of the spacer 800a. As described above, even when the energy storage device 10 includes the spacer 800a according to the present modification, the effect of being able to effectively manufacture the energy storage device 10 is exerted.

[10. Third Modification]

Figure 15:
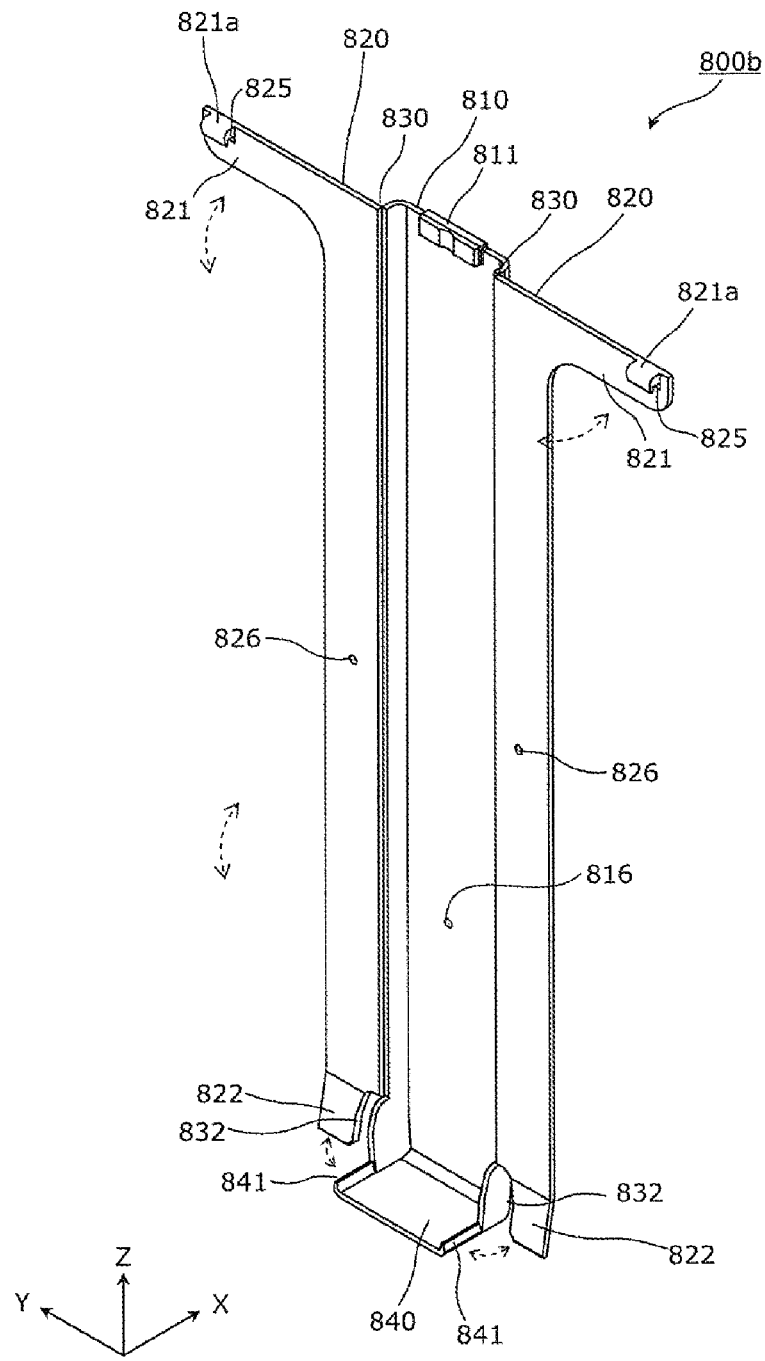
FIG. 15 is a perspective view of a spacer according to a third modification of the embodiment.

FIG. 15 is a perspective view illustrating a spacer 800b according to a third modification of the embodiment, with two side portions 820 opened. As illustrated in FIG. 15, the spacer 800b according to the present modification, like the spacer 800 according to the embodiment, has the rear portion 810 disposed to face the end portion of the electrode assembly 200 (the electrode-assembly end portion 220 in the present modification), the side portion 820 extended in a direction along the side surface of the electrode assembly 200, and the connection 830 that rotatably connects the side portion 820 to the rear portion 810. That is, in the basic configuration, the spacer 800b according to the present modification is common to the spacer 800 according to the embodiment. However, the spacer 800b does not have the rear convex part 812, and the inner surface of the side portion 820 according to the present modification has a flat shape unlike that of the side portion 820 (cf. FIG. 4) according to the embodiment. Even in this instance, since the spacer 800b has a basic configuration common to the spacer 800 according to the embodiment, the effect of being able to effectively manufacture the energy storage device 10 is exerted.

[11. Fourth Modification]

Figure 16:
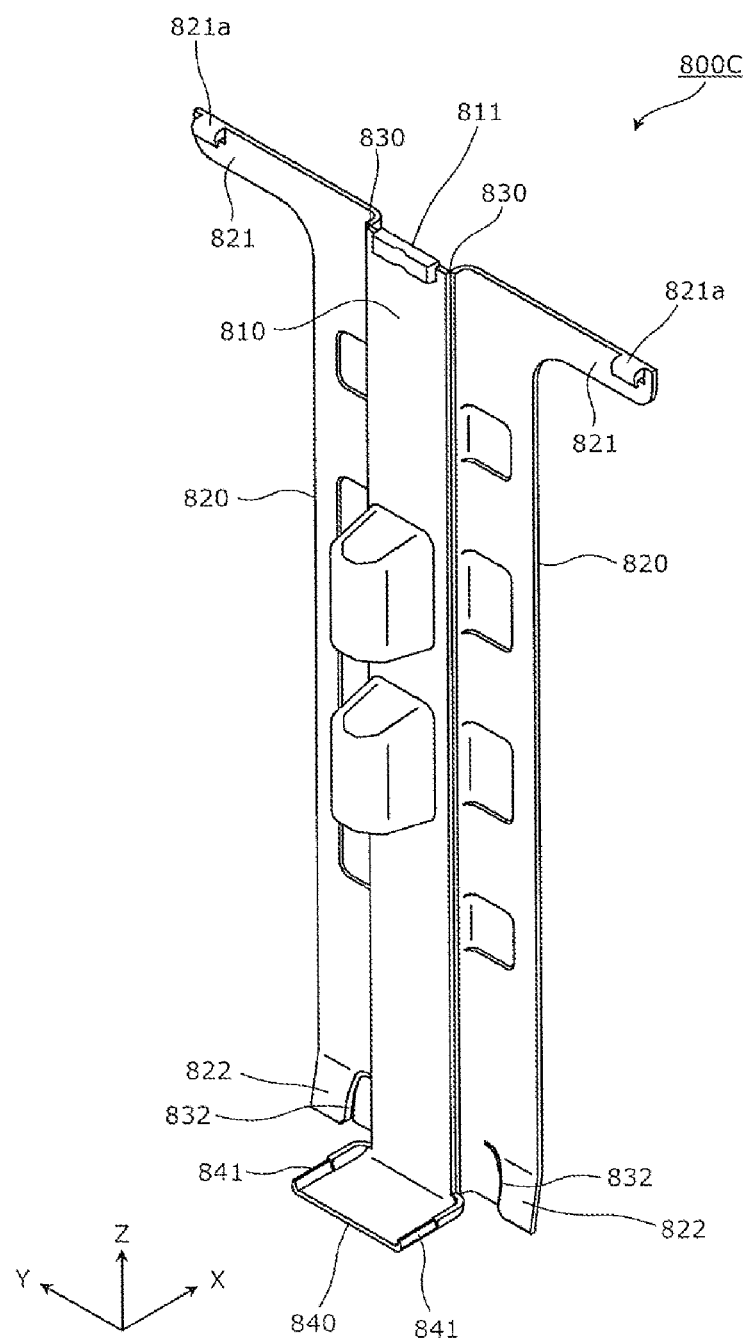
FIG. 16 is a perspective view illustrating a spacer according to a fourth modification of the embodiment, with two side portions opened.

FIG. 16 is a perspective view illustrating a spacer 800c according to a fourth modification of the embodiment, with two side portions 820 opened. As illustrated in FIG. 16, the spacer 800c according to the present modification, like the spacer 800 according to the embodiment, has the rear portion 810 disposed to face the end portion of the electrode assembly 200, the side portion 820 extended in a direction along the side surface of the electrode assembly 200, and the connection 830 that rotatably connects the side portion 820 to the rear portion 810. That is, in the basic configuration, the spacer 800c according to the present modification is common to the spacer 800 according to the embodiment. However, in the spacer 800c, the connection 830 is disposed at a position facing the first wall 111 (cf. FIG. 2) and is different from the spacer 800 according to the embodiment in this respect.

The spacer 800c according to the present modification has the above configuration, whereby at the time of disposing the spacer 800c on the electrode assembly 200, the side portion 820 is rotated with respect to the rear portion 810, and the side portion 820 can be easily disposed with respect to the electrode assembly 200. It is thereby possible to prevent damage to the spacer 800c. In the spacer 800c, the corner between the rear portion 810 and the side portion 820 is a part subjected to stress, and hence when the connection 830 is disposed at the position of the corner, the connection 830 is damaged easily. Therefore, the connection 830 is disposed to face the end portion of the first wall 111. Accordingly, the connection 830 is disposed not at the corner but on the rear portion 810 side of the spacer 800c rather than at the corner, so that the damage of the connection 830 can be prevented. Since the connection 830 is disposed at the end portion of the spacer 800c on the rear portion 810 side, the side portion 820 can be largely opened with respect to the rear portion 810 and then disposed on the electrode assembly 200. Hence the spacer 800c can be easily disposed with respect to the electrode assembly 200. In particular, the side portions 820 on both sides of the rear portion 810 can be largely opened and then the electrode assembly 200 can be sandwiched therebetween, whereby the electrode assembly 200 can be stably and firmly sandwiched while the spacer 800c is easily disposed with respect to the electrode assembly 200. Hence it is possible to realize the energy storage device 10 capable of preventing damage to the spacer 800c. Since the connection 830 only need be formed at the plane part rather than at the corner, it is possible to easily form the connection 830 and easily manufacture the spacer 800c.

(Other Modifications)

Although the energy storage devices according to the embodiment of the present invention and its modifications have been described above, the present invention is not limited to the embodiment and its modifications. That is, the presently disclosed embodiments and their modifications are exemplary in all respects and are not restrictive. The scope of the present invention is defined by the claims and includes meanings equivalent to the claims and all modifications within the claims.

In the embodiment and its modifications, the spacer has been the side spacer in which the rear portion is disposed to face the first wall 111 (short side portion) of the case 100, and the side portion is disposed to face the second wall 112 (long side portion) of the case 100. However, the configuration of the spacer (800, 900) according to the embodiment or the modifications can be applied to various spacers in which the rear portion faces the end portion of the electrode assembly, and the side portion is extended in a direction along the side surface of the electrode assembly. That is, the spacer may be disposed with the rear portion and the side portion facing any wall of the case 100. The spacer may be disposed with the rear portion facing the second wall 112 (long side portion) and the side portion facing the first wall 111 (short side portion). The spacer may be disposed with the rear portion facing the third wall 113 (bottom wall) of the case 100 and the side portion facing the first wall 111 (short side portion) or the second wall 112 (long side portion). The spacer may be disposed with the rear portion facing the lid 120 of the case 100 and the side portion facing the first wall 111 (short side portion) or the second wall 112 (long side portion).

In the embodiment and its modified example, the spacer has had two side portions. However, the spacer may have only one side portion. The number of legs provided on the current collector need not be one or two, but may be three or more. A current collector having two or more legs may be connected to two or more electrode assemblies. That is, the number of electrode assemblies provided in the energy storage device may be two or more.

In the embodiment, the engagement portion of the spacer has been inserted into the engagement recess of the lower gasket to engage the engagement portion with the lower gasket. However, this engagement relationship may be reversed. That is, the lower gasket may have an engagement convex part, and the engagement convex part may be inserted into an engagement portion, which is a recess, hole, or the like, of the spacer so that the engagement portion is engaged with the lower gasket.

In the embodiment and its modifications, the electrode assembly has been a so-called longitudinally wound electrode assembly in which the winding axis W is parallel to the lid 120. However, the electrode assembly may be a so-called horizontally wound electrode assembly in which a winding axis is perpendicular to the lid 120. The shape of the electrode assembly is not limited to the winding type but may be a stack type in which planar electrode plates are stuck, a shape in which an electrode plate and/or separator are folded in a bellows shape (a form in which a separator is sinuously folded to sandwich a rectangular electrode plate, a form in which an electrode plate and a separator are superimposed on each other and sinuously folded, etc.), and some other shape. In these instances, for example, the end portion of the electrode assembly on the first wall 111 (short side portion) side of the case 100 can be defined as the electrode-assembly end portion. That is, also in these instances, the spacer is disposed with the rear portion facing the first wall 111 (short side portion) of the case 100 and the side portion facing the second wall 112 (long side portion) of the case 100. As described above, the spacer may be disposed with the rear portion and the side portion facing any wall of the case 100.

In the embodiment and its modifications, both the positive electrode side and the negative electrode side have had the above configuration, but only one of the positive electrode side and the negative electrode side may have the above configuration.

The scope of the present invention also includes forms constructed by arbitrarily combining the components included in the embodiment and its modifications.

The present invention can be realized not only as the energy storage device as thus described but also as the spacer provided in the energy storage device.

INDUSTRIAL APPLICABILITY

The present invention can be applied to an energy storage device such as a lithium ion secondary battery.

DESCRIPTION OF REFERENCE SIGNS

10, 10*a*: Energy storage device
100: Case
110: Case body
111: First wall
112: Second wall
113: Third wall
120: Lid
120*a*, 140*a*, 150*a*, 310*a*: Through hole
130: Electrode terminal
150, 160: Lower gasket
151, 161: Engagement recess
151*a*: Hook insertion portion
153: Rear-side recess
200, 400: Electrode assembly
220, 420: Electrode-assembly end portion
300, 350: Current collector
310, 360: Fixed end portion
310*b*: Side surface
800, 800*a*, 800*b*, 800*c*, 900: Spacer
810, 910: Rear portion
811: Projection
812: Rear convex part
814, 924: Side convex part
816, 826: Inflow mark
820, 920: Side portion
821, 921: Cover portion
821*a*, 921*a*: Engagement portion
821*b*: Hook
822, 922: Side end portion
825, 925: Opening
830, 930: Connection
832, 932: Notch
840, 940: Bottom portion
841, 941: Locking portion

The invention claimed is:

1. An energy storage device comprising:
   an electrode assembly;
   a case that houses the electrode assembly; and
   a side spacer disposed between the electrode assembly and the case,
   wherein the side spacer includes:
      a rear portion that is disposed to face an end portion of the electrode assembly;
      a side portion that is extended in a direction along a side surface of the electrode assembly; and
      a connection that rotatably connects the side portion to the rear portion,
   wherein the side spacer is formed using a resin material, and
   wherein at least one of the rear portion and the side portion includes an inflow mark of the resin material.

2. The energy storage device according to claim 1, wherein
   the case includes a first wall and a second wall adjacent to the first wall,
   the rear portion is disposed to face the first wall, and the side portion is disposed to face the second wall, and
   the connection is disposed to face an end portion of the first wall or an end portion of the second wall.

3. The energy storage device according to claim 1, wherein the side spacer includes a convex part projecting toward the electrode assembly.

4. The energy storage device according to claim 1, wherein
   the electrode assembly is formed by an electrode plate and a separator being wound, and
   the rear portion is disposed to face an end portion of the electrode assembly in a winding-axis direction.

* * * * *